(12) United States Patent
Shimokawa et al.

(10) Patent No.: US 12,009,698 B2
(45) Date of Patent: Jun. 11, 2024

(54) ROTOR, ELECTRIC MOTOR, FAN, AND AIR CONDITIONER

(71) Applicant: Mitsubishi Electric Corporation, Tokyo (JP)

(72) Inventors: Takaya Shimokawa, Tokyo (JP); Hiroki Aso, Tokyo (JP); Naoki Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 17/770,088

(22) PCT Filed: Dec. 12, 2019

(86) PCT No.: PCT/JP2019/048607
§ 371 (c)(1),
(2) Date: Apr. 19, 2022

(87) PCT Pub. No.: WO2021/117176
PCT Pub. Date: Jun. 17, 2021

(65) Prior Publication Data
US 2022/0376568 A1 Nov. 24, 2022

(51) Int. Cl.
*H02K 1/27* (2022.01)
*H02K 1/276* (2022.01)
*H02K 1/28* (2006.01)
*H02K 21/16* (2006.01)

(52) U.S. Cl.
CPC ............. *H02K 1/276* (2013.01); *H02K 1/28* (2013.01); *H02K 21/16* (2013.01)

(58) Field of Classification Search
CPC .......... H02K 1/276; H02K 1/28; H02K 21/16; H02K 1/2746; H02K 1/246; H02K 2201/03; H02K 2211/03; H02K 2213/03
See application file for complete search history.

(56) References Cited

U.S. PATENT DOCUMENTS

2019/0199149 A1\* 6/2019 Oikawa .................. H02K 1/146
2020/0287430 A1 9/2020 Tago et al.

FOREIGN PATENT DOCUMENTS

| JP | 2004-096925 A | 3/2004 |
|---|---|---|
| JP | 2011-182552 A | 9/2011 |
| JP | 2012-085433 A | 4/2012 |
| JP | 2012-213268 A | 11/2012 |
| JP | 2019-068620 A | 4/2019 |
| WO | 2017-0221341 A1 | 12/2017 |

OTHER PUBLICATIONS

International Search Report of the International Searching Authority mailed on Mar. 10, 2020 issued in the corresponding International Application No. PCT/JP2019/048607 (and English translation attached).

\* cited by examiner

*Primary Examiner* — Thomas Truong
(74) *Attorney, Agent, or Firm* — Posz Law Group, PLC

(57) ABSTRACT

A rotor includes a plurality of cores stacked in an axial direction, a permanent magnet, and a nonmagnetic resin. The plurality of cores include a magnet insertion hole, a first opening communicating with one end of the magnet insertion hole in a circumferential direction, and an indent part communicating with the first opening and indented in the circumferential direction. The permanent magnet is disposed in the magnet insertion hole. The nonmagnetic resin is provided in the first opening and the indent part.

19 Claims, 22 Drawing Sheets

ROTOR, ELECTRIC MOTOR, FAN, AND AIR CONDITIONER

CROSS REFERENCE TO RELATED APPLICATION

This application is a U.S. national stage application of International Patent Application No. PCT/JP2019/048607 filed on Dec. 12, 2019, the disclosure of which is incorporated herein by reference.

TECHNICAL FIELD

The present invention relates to a rotor of an electric motor.

BACKGROUND

A rotor including an opening communicating with one end of a magnet insertion hole in a circumferential direction has been proposed in general (see, for example, Patent Reference 1). Magnetic resistance in an opening is generally larger than magnetic resistance in a rotor core. Thus, the rotor has the advantage of reducing leakage flux flowing from a permanent magnet in the magnet insertion hole toward the opening.

Patent Reference

Patent Reference 1: International Patent Publication No. 2017/221341

In the case where the rotor has the opening communicating with one end of a magnet insertion hole in a circumferential direction, however, there is a problem in that strength of the rotor decreases.

SUMMARY

It is therefore an object of the present invention to increase strength of a rotor with reduction of leakage flux in the rotor.

A rotor according to one aspect of the present invention includes: a plurality of cores including a magnet insertion hole, a first opening communicating with one end of the magnet insertion hole in a circumferential direction, and an indent part communicating with the first opening and indented in the circumferential direction, the plurality of cores being stacked in an axial direction; a permanent magnet disposed in the magnet insertion hole; and a non-magnetic resin provided in the first opening and the indent part, wherein the indent part is formed between two adjacent cores of the plurality of cores.

An electric motor according to another aspect of the present invention includes: the rotor; and a stator disposed outside the rotor.

A fan according to another aspect of the present invention includes: a blade; and the electric motor to drive the blade.

An air conditioner according to another aspect of the present invention includes: an indoor unit; and an outdoor unit connected to the indoor unit, wherein the indoor unit, the outdoor unit, or both the indoor unit and the outdoor unit include the electric motor.

According to the present invention, leakage flux in the rotor can be reduced, and strength of the rotor can be increased.

DETAILED DESCRIPTION

First Embodiment

An electric motor 1 according to a first embodiment of the present invention will be described.

In an xyz orthogonal coordinate system shown in each drawing, a z-axis direction (z axis) represents a direction parallel to an axis Ax of an electric motor 1, an x-axis direction (x axis) represents a direction orthogonal to the z-axis direction (z axis), and a y-axis direction (y axis) represents a direction orthogonal to both the z-axis direction and the x-axis direction. The axis line Ax is a rotation center of a rotor 2, that is, a rotation axis of the rotor 2. The direction parallel to the axis line Ax will also be referred to as an "axis direction of the rotor 2" or simply an "axis direction." The radial direction refers to a radial direction of the rotor 2 or a stator 3, and is a direction orthogonal to the axis Ax. An xy plane is a plane orthogonal to the axial direction. An arrow Dl represents a circumferential direction about the axis Ax. A circumferential direction of the rotor 2 or the stator 3 will also be simply referred to as a "circumferential direction."

<Electric Motor 1>

Figure 1:
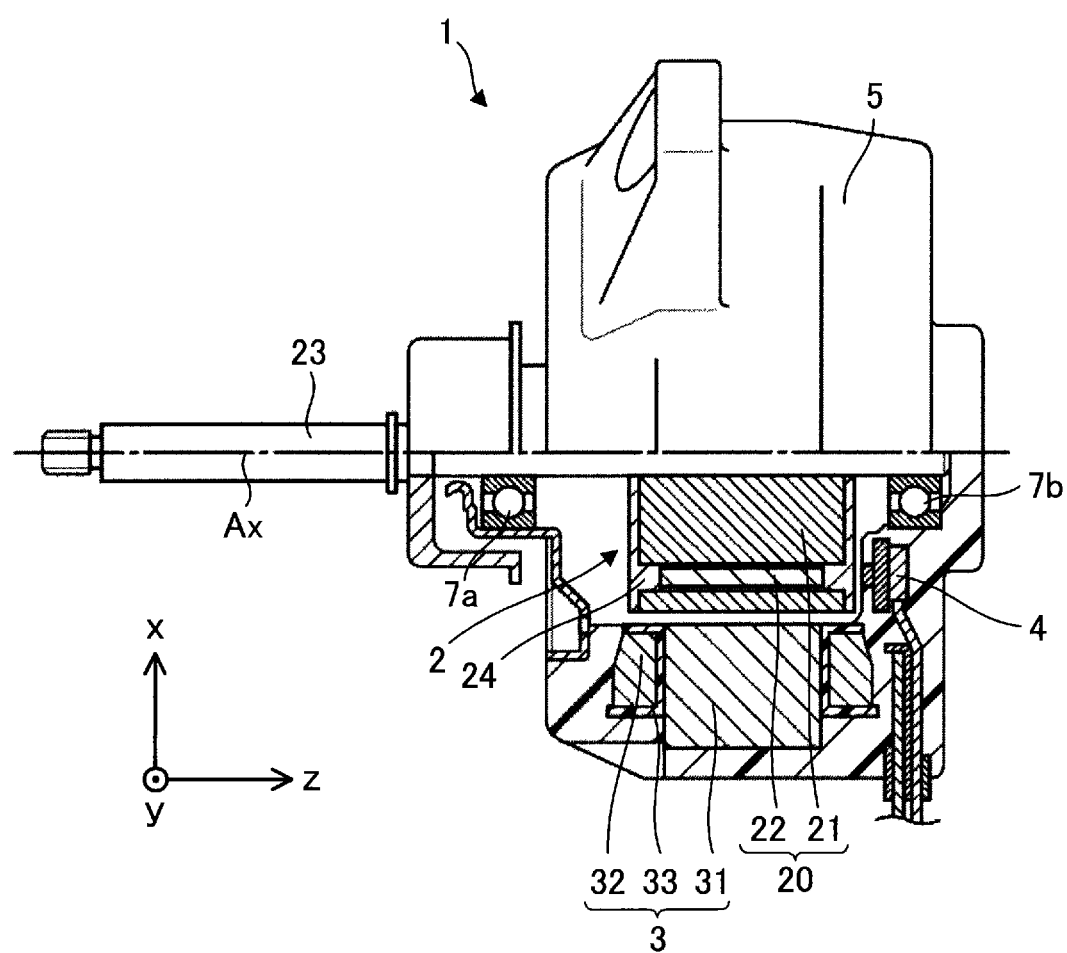
FIG. 1 is a partial cross-sectional view schematically illustrating a structure of an electric motor according to a first embodiment of the present invention.

FIG. 1 is a partial cross-sectional view schematically illustrating a structure of the electric motor 1 according to the first embodiment.

Figure 2:
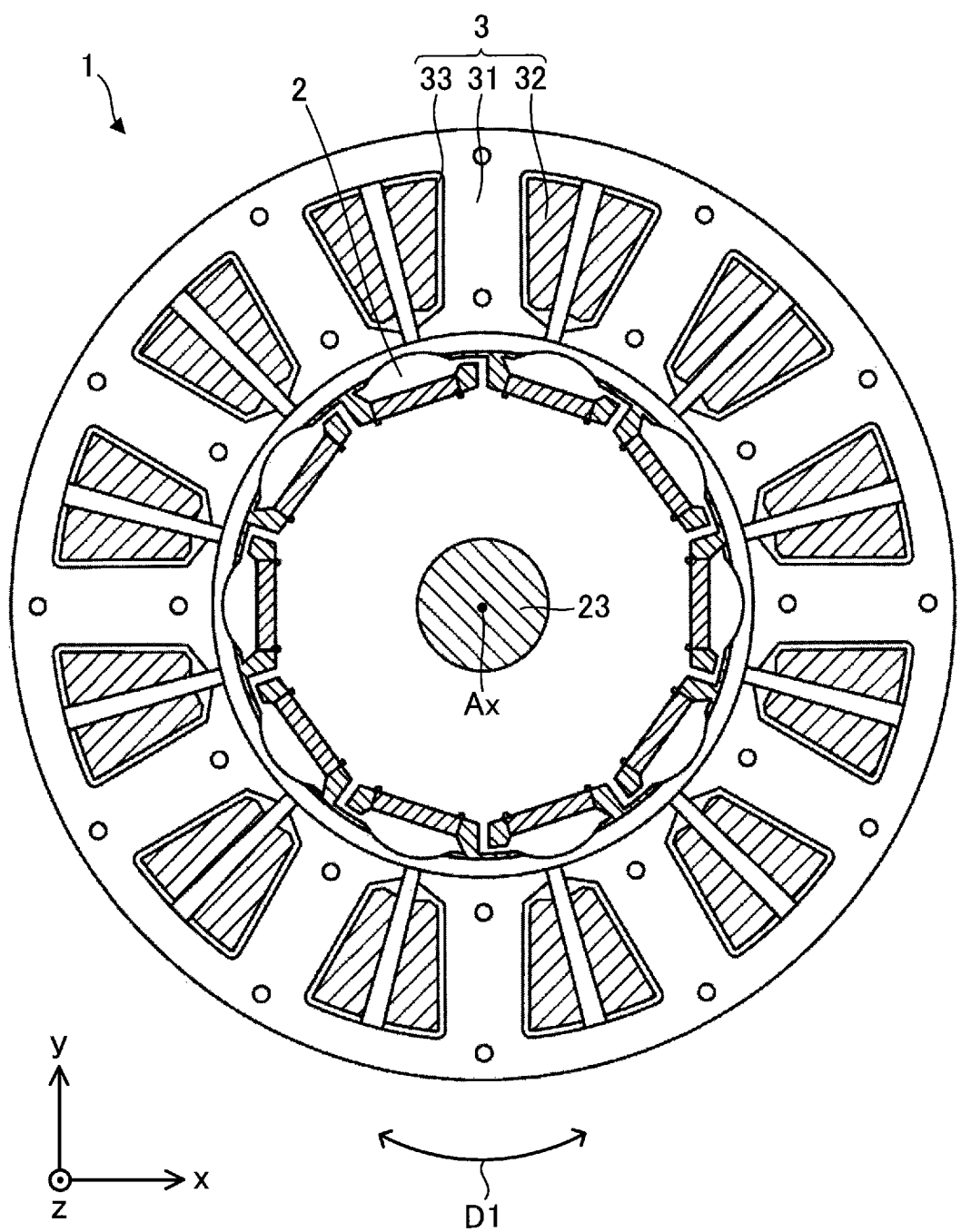
FIG. 2 is a cross-sectional view schematically illustrating the structure of the electric motor.

FIG. 2 is a cross-sectional view schematically illustrating a structure of the electric motor 1.

The electric motor 1 includes the rotor 2, the stator 3, a circuit board 4, a molding resin 5, and bearings 7a and 7b for rotatably retaining the rotor 2. The electric motor 1 is, for example, a permanent magnet synchronous electric motor such as an interior permanent magnet electric motor (IPM electric motor).

<Stator 3>

The stator 3 is disposed outside the rotor 2. The stator 3 includes a stator core 31, a coil 32, and an insulator 33. The stator core 31 includes a ring-shaped core back and a plurality of teeth extending in the radial direction from the core back.

The stator core 31 is constituted by, for example, a plurality of thin iron magnetic sheets. In this embodiment, the stator core 31 is constituted by a plurality of electromagnetic steel sheets stacked in the axial direction. Each of the electromagnetic steel sheets of the stator core 31 has a thickness of 0.2 mm to 0.5 mm, for example.

The coil 32 (i.e., winding) is wound around the insulator 33 attached to the stator core 31. The coil 32 is insulated by the insulator 33. The coil 32 is made of a material containing copper or aluminium, for example.

The insulator 33 is made of, for example, an insulative resin such as polybutylene terephthalate (PBT), polyphenylene sulfide (PPS), liquid crystal polymer (LCP), or polyethylene terephthalate (PET). The insulator 33 that is made of resin is, for example, an insulating film having a thickness of 0.035 mm to 0.4 mm.

For example, the insulator 33 is shaped integrally with the stator core 31. It should be noted that the insulator 33 may be shaped separately from the stator core 31. In this case, after the insulator 33 has been shaped, the insulator 33 is fitted in the stator core 31.

In this embodiment, the stator core 31, the coil 32, and the insulator 33 are covered with the molding resin 5. The stator core 31, the coil 32, and the insulator 33 may be fixed by a cylindrical shell made of a material containing iron, for example. In this case, the stator 3 is covered with a cylindrical shell by shrink fitting together with the rotor 2, for example.

The circuit board 4 is fixed to the stator 3. The circuit board 4 includes a driving device for controlling the electric motor 1.

The molding resin 5 unites the circuit board 4 and the stator 3 together. The molding resin 5 is, for example, a thermosetting resin such as an unsaturated polyester resin (BMC) or an epoxy resin.

<Rotor 2>

Figure 3:
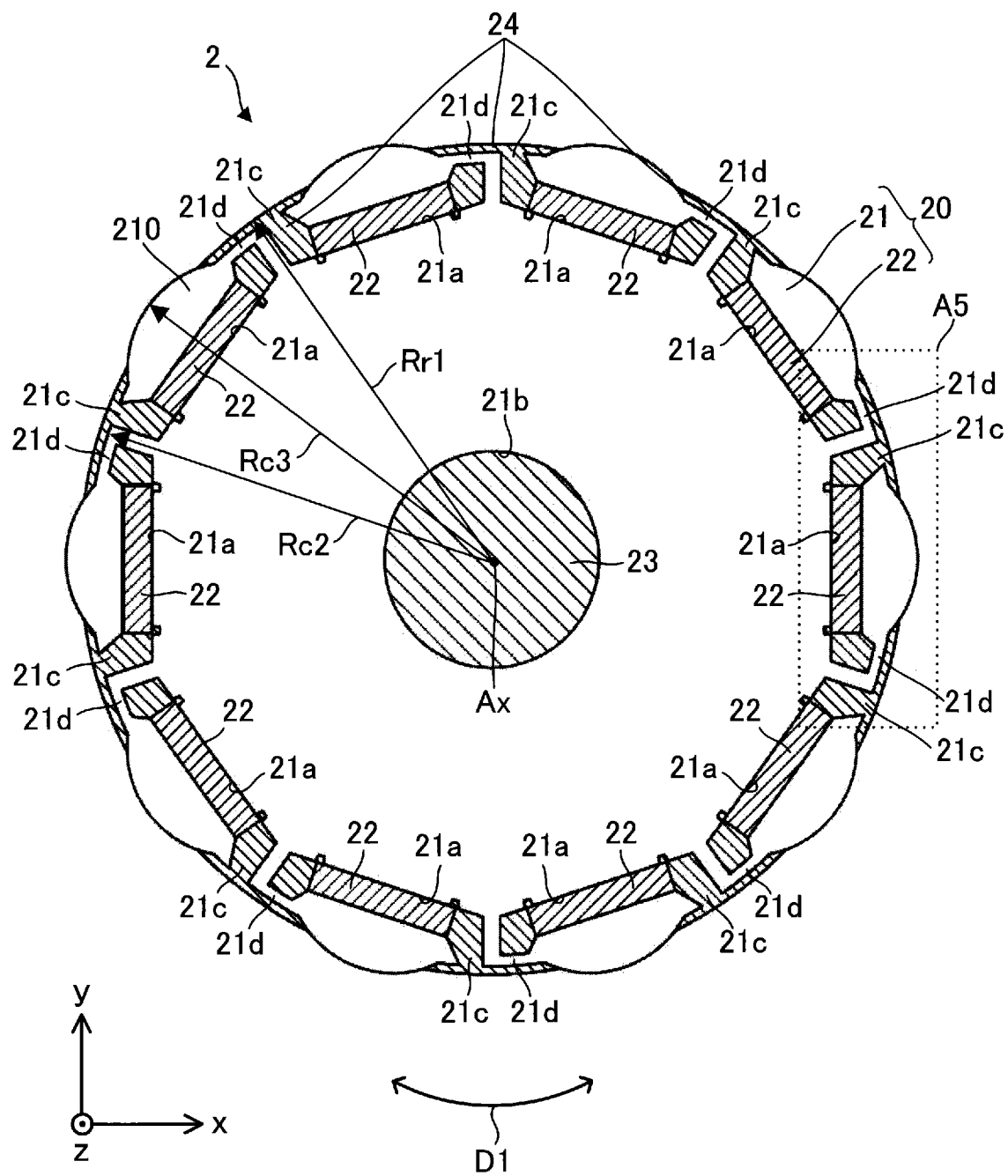
FIG. 3 is a cross-sectional view schematically illustrating a structure of a rotor.
Figure 4:
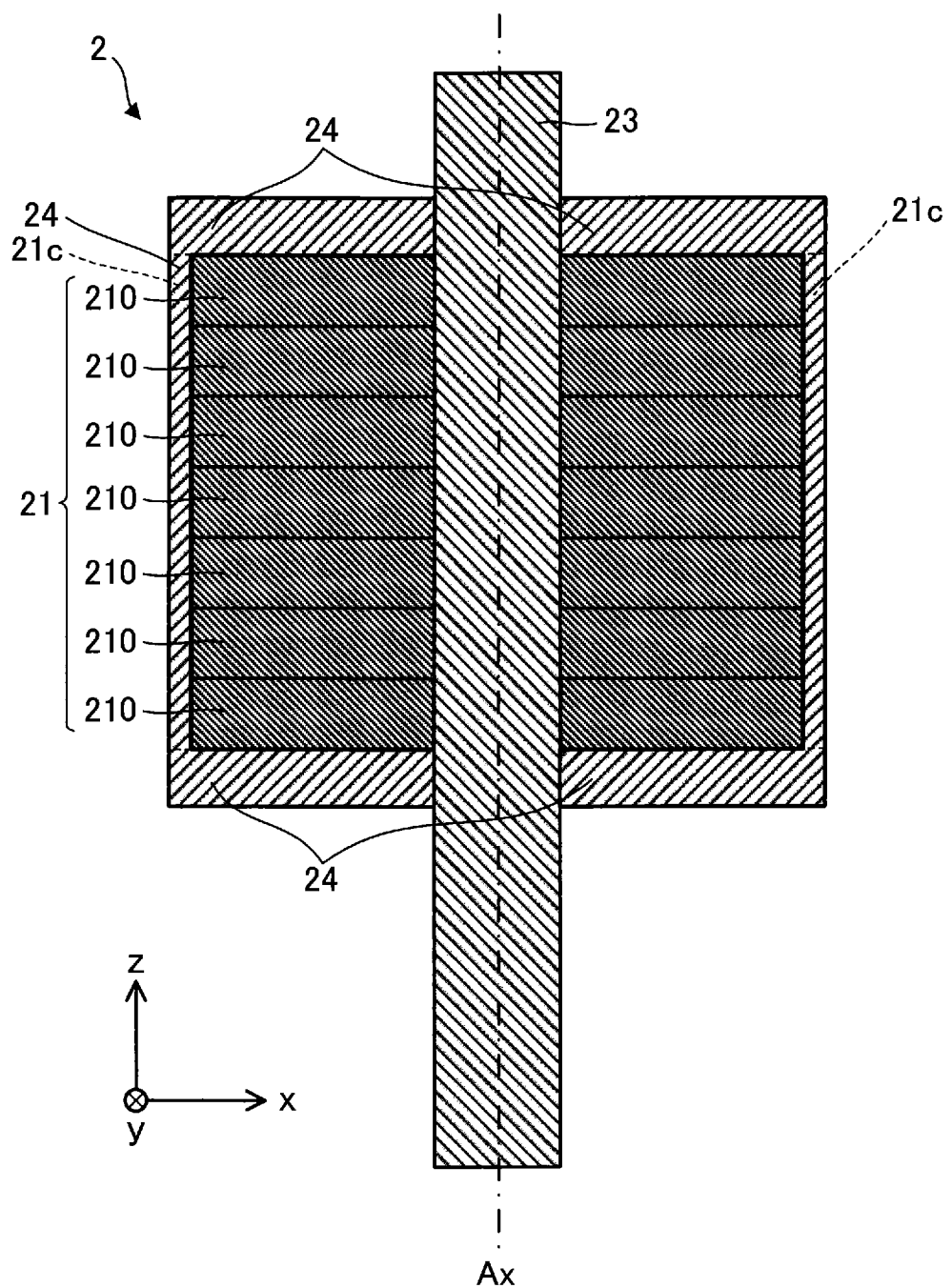
FIG. 4 is a cross-sectional view schematically illustrating the structure of the rotor.

FIGS. 3 and 4 are cross-sectional views schematically illustrating a structure of the rotor 2.

The rotor 2 includes a main magnet 20, a shaft 23, and a nonmagnetic resin 24. The rotor 2 is rotatably disposed inside the stator 3. Specifically, the rotor 2 is disposed at the inner side of the stator 3 such that the main magnet 20 faces the stator 3. An air gap is disposed between the main magnet 20 and the stator 3.

The main magnet 20 includes a rotor core 21 and at least one permanent magnet 22 fixed to the rotor core 21. The rotation axis of the rotor 2 coincides with the axis line Ax. The rotor 2 is, for example, an interior permanent magnet rotor (IPM rotor). In this embodiment, the rotor 2 is a consequent-pole type rotor.

As illustrated in FIG. 4, the rotor core 21 is constituted by a plurality of cores 210 stacked in the axial direction. The rotor core 21 (i.e., the plurality of cores 210) is fixed to the shaft 23. The shaft 23 is rotatably held by bearings 7a and 7b. When the electric motor 1 is driven, the main magnet 20 rotates together with the shaft 23.

As illustrated in FIG. 1, the rotor core 21 may be longer than the stator core 31 in the axial direction. Accordingly, magnetic flux from the rotor 2 (specifically the main magnet 20) efficiently flows into the stator core 31.

The rotor 2, specifically the main magnet 20, has a first magnetic pole with a first polarity and a second magnetic pole with a second polarity different from the first polarity. In this embodiment, the first magnetic pole is a north pole, and the second magnetic pole is a south pole.

The rotor core 21 (i.e., the plurality of cores 210) includes at least one magnet insertion hole 21a, a shaft hole 21b, at least one first opening 21c, at least one first closing part 21d, and at least one indent part 21e. For example, it is sufficient that at least one of the plurality of cores 210 includes at least one first opening 21c, at least one first closing part 21d, and at least one indent part 21e.

In this embodiment, the rotor core 21 includes a plurality of magnet insertion holes 21a, and at least one permanent magnet 22 is disposed in each of the magnet insertion holes 21a. That is, in this embodiment, the electric motor 1 is an interior permanent magnet electric motor.

The rotor core 21 is constituted by, for example, a plurality of electromagnetic steel sheets. In this case, each of the plurality of cores 210 is an electromagnetic steel sheet. The plurality of cores 210 may include cores other than electromagnetic steel sheets. For example, the rotor core 21 may be constituted by a plurality of iron cores each having a predetermined shape.

Each of the electromagnetic steel sheets of the rotor core 21 has a thickness of 0.2 mm to 0.5 mm, for example. The electromagnetic steel sheets of the rotor core 21 are stacked in the axial direction.

The plurality of magnet insertion holes 21a are formed at regular intervals in the circumferential direction of the rotor core 21. In this embodiment, ten magnet insertion holes 21a are formed in the rotor core 21. Each of the magnet insertion holes 21a penetrates the rotor core 21 in the axial direction.

The shaft hole 21b is formed in a center portion of the rotor core 21. The shaft hole 21b penetrates the rotor core 21 in the axial direction. The shaft 23 is disposed in the shaft hole 21b.

The shaft 23 is fixed to the rotor core 21 by a thermoplastic resin such as polybutylene terephthalate, press fitting, shrink fitting, or caulking. The shape of the thermoplastic resin is appropriately adjusted in accordance with purposes of the electric motor 1. In this case, the shaft hole 21b is filled with a thermoplastic resin that is a nonmagnetic material.

The permanent magnet 22 is disposed in each magnet insertion hole 21a. Each permanent magnet 22 is, for example, a flat-plate permanent magnet. The permanent magnet 22 in each magnet insertion hole 21a is fixed with the nonmagnetic resin 24. The permanent magnet 22 may be, for example, a rare earth magnet containing neodymium or samarium. The permanent magnet 22 may be a ferrite magnet containing iron. The type of the permanent magnet 22 is not limited to the example of this embodiment, and the permanent magnet 22 may be made of another material.

The permanent magnet 22 in each magnet insertion hole 21a is magnetized in the radial direction, and thus magnetic flux from the main magnet 20 flows into the stator 3.

The nonmagnetic resin 24 is made of, for example, a nonmagnetic thermoplastic resin such as polybutylene terephthalate (PBT), polyphenylene sulfide (PPS), liquid crystal polymer (LCP), or polyethylene terephthalate (PET).

As illustrated in FIG. 3, the nonmagnetic resin 24 is in contact with the permanent magnet 22 in the magnet insertion hole 21a. The nonmagnetic resin 24 can fix the position of the permanent magnet 22 in the magnet insertion hole 21a to thereby prevent vibration of the permanent magnet 22 during rotation of the rotor 2. As a result, collision of the permanent magnet 22 against the rotor core 21 can be prevented during rotation of the rotor 2 and consequently noise of the electric motor 1 can be reduced.

In the example illustrated in FIG. 3, the rotor core 21 in the magnetic pole center part projects outward in the radial direction. The rotor 2 satisfies Rc3>Rc2 and Rr1>Rc2, where Rc2 is a radius of the plurality of cores 210 in the inter-pole part of the rotor 2 (specifically the main magnet 20), Rc3 is a radius of the plurality of cores 210 in the magnetic pole center part of the rotor 2 (specifically the main magnet 20), and Rr1 is a maximum radius of the nonmagnetic resin 24.

In the xy plane illustrated in FIG. 3, each magnetic pole center part of the rotor 2 is located on a line passing through the center of the corresponding permanent magnet 22 and the axis Ax. In the xy plane illustrated in FIG. 3, each inter-pole part of the rotor 2 is located on a line passing through a point between adjacent permanent magnets 22 and the axis Ax.

The radius Rc2 of each of the plurality of cores 210 in the inter-pole part of the rotor 2 is the radius of the rotor core 21 in the inter-pole part of the rotor 2. The radius Rc3 of each of the plurality of cores 210 in the magnetic pole center part of the rotor 2 is the radius of the rotor core 21 in the magnetic pole center part of the rotor 2. The maximum radius Rr1 of the nonmagnetic resin 24 refers to a maximum distance from the axis Ax to the outer peripheral surface of the nonmagnetic resin 24 in the xy plane.

If the rotor 2 satisfies Rc3>Rc2 and Rr1>Rc2, at least a part of the outer peripheral surface of the rotor core 21 is covered with the nonmagnetic resin 24. Accordingly, strength of the rotor core 21 can be increased. For example, it is possible to increase the strength of the rotor core 21 to a centrifugal force exerted on the main magnet 20 during rotation of the rotor 2.

As the size of the gap between the rotor 2 and the stator 3 decreases, a magnetic force of the rotor 2 can be more effectively used. Thus, the rotor 2 preferably satisfies Rr1 Rc3. In this case, no nonmagnetic resin 24 is present between the outer peripheral surface of the rotor core 21 and the stator 3 in the magnetic pole center part, and the outer peripheral surface of the rotor core 21 in the magnetic pole center part directly faces the stator 3. Thus, an air gap formed between the outer peripheral surface of the rotor core 21 and the stator 3 in the magnetic pole center part can be set at a limit of an air gap that can be set. As a result, a magnetic force of the rotor 2 can be effectively used, and efficiency of the electric motor 1 can be increased.

<Main Magnet 20>

The main magnet 20 will be more specifically described.

As illustrated in FIG. 3, the main magnet 20 includes a plurality of first openings 21c (ten first openings 21c in FIG. 3), a plurality of first closing parts 21d (ten first closing parts 21d in FIG. 3).

Figure 5:
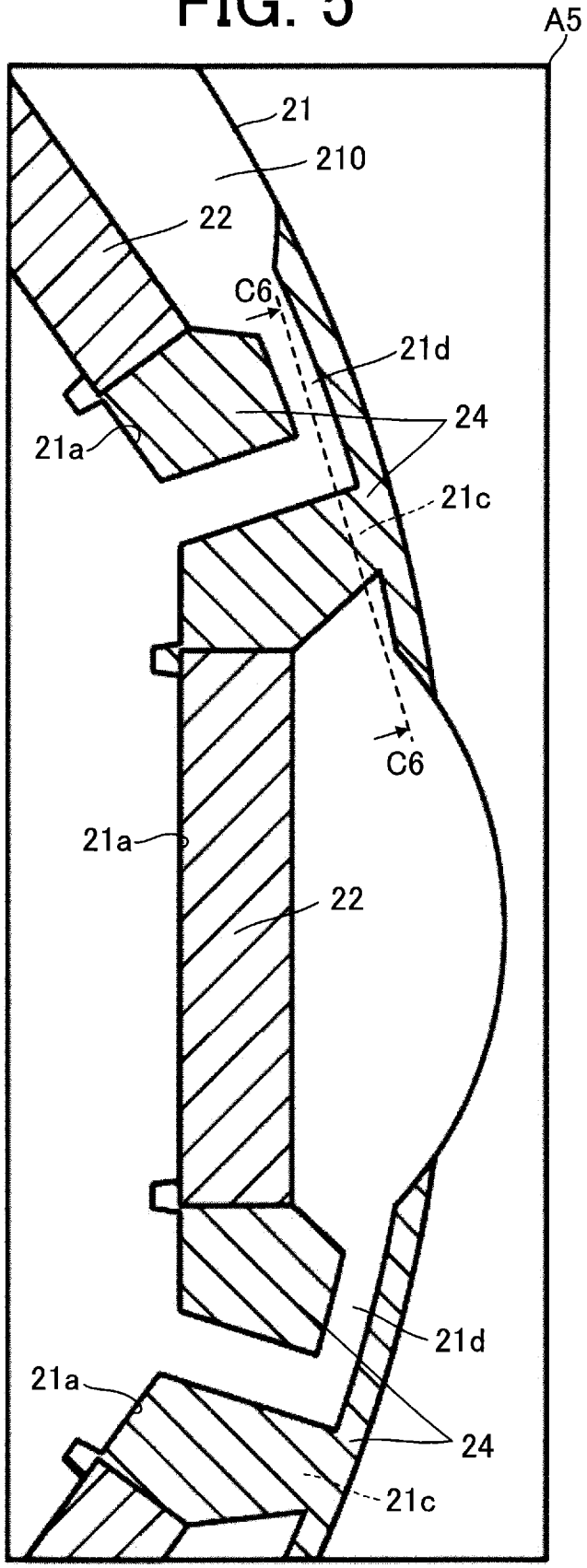
FIG. 5 is an enlarged view illustrating an area A5 shown in FIG. 3.

FIG. 5 is an enlarged view illustrating an area A5 shown in FIG. 3.

Each of the first openings 21c communicates with one end of the magnet insertion hole 21a in the circumferential direction. Thus, in the xy plane, one end of the magnet insertion hole 21a in the circumferential direction communicates with the outside of the main magnet 20. In this case, one end of the magnet insertion hole 21a in the circumferential direction is a downstream side of the magnet insertion hole 21a in the rotation direction of the rotor 2. That is, in the xy plane, the downstream side of the magnet insertion hole 21a in the rotation direction of the rotor 2 communicates with the outside of the main magnet 20.

Each first closing part 21d closes the other end of the magnet insertion hole in the circumferential direction. Thus, in the xy plane, the other end of the magnet insertion hole 21a in the circumferential direction does not communicate with the outside of the main magnet 20. In this case, the other end of the magnet insertion hole 21a in the circumferential direction is an upstream side of the magnet insertion hole 21a in the rotation direction of the rotor 2. That is, each first closing part 21d closes the upstream side of the magnet insertion hole 21a in the rotation direction of the rotor 2.

Figure 6:
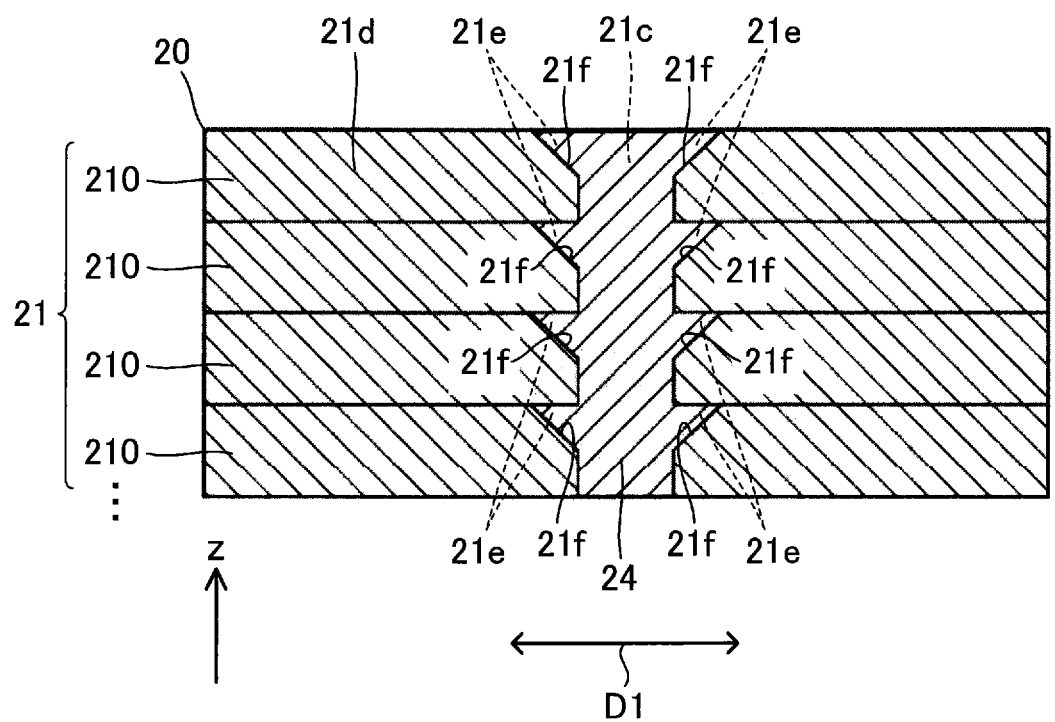
FIG. 6 is a cross-sectional view taken along line C6-C6 in FIG. 5.

FIG. 6 is a cross-sectional view taken along line C6-C6 in FIG. 5.

The rotor core 21 includes at least one flat surface 21f. In the example illustrated in FIG. 6, each of the plurality of cores 210 has the flat surface 21f. It is sufficient that at least one of the plurality of cores 210 has the flat surface 21f.

Each flat surface 21f tilts toward the first opening 21c along the surface of the core 210. In other words, each flat surface 21f tilts with respect to the axial direction (z direction in FIG. 6), and also tilts with respect to the direction orthogonal to the axial direction. Further, in other words, each flat surface 21f is linearly formed in the cross section illustrated in FIG. 6.

As illustrated in FIG. 6, the main magnet 20 has a plurality of indent parts 21e. For example, the indent part 21e is formed between two adjacent cores 210 of the plurality of cores 210. Each indent part 21e communicates with the first opening 21c. Each indent part 21e is indented in the circumferential direction. The size of each indent part 21e gradually decreases in a direction away from the first opening 21c in the circumferential direction.

The nonmagnetic resin 24 is provided in each first opening 21c and each indent part 21e. In the example illustrated in FIG. 3, the nonmagnetic resin 24 constitutes a part of the outer peripheral surface of the rotor 2. Specifically, a part of the nonmagnetic resin 24 and a part of the rotor core 21 are alternately arranged in the circumferential direction, and the nonmagnetic resin 24 and the rotor core 21 form the outer peripheral surface of the rotor 2.

For example, in a case where the main magnet of the IPM motor does not include any opening corresponding to the first opening 21c, the magnet insertion holes are surrounded by the rotor core in the xy plane. That is, regions around the magnet insertion holes are coupled to each other by the ring-shaped core. In this case, magnetic resistance decreases in regions around these magnet insertion holes. For example, magnetic flux from the surfaces of the permanent magnets in the magnet insertion holes passes through thin portions between the magnet insertion holes and the outer peripheral surface of the rotor core, and flow toward the other surfaces of these permanent magnets. That is, magnetic flux from the surfaces of permanent magnets in the magnet insertion holes forms loops in the rotor core, and as a result, leakage flux not contributing rotation of the rotor increases.

On the other hand, in this embodiment, the main magnet 20 includes at least one first opening 21c. Each first opening 21c communicates with one end of the magnet insertion hole 21a in the circumferential direction. Accordingly, in the xy plane, one end of the magnet insertion hole 21a in the circumferential direction communicates with the outside of the main magnet 20. Thus, magnetic resistance can be increased at one end of the magnet insertion hole 21a in the circumferential direction. As a result, leakage flux in the rotor 2 can be reduced.

Since the main magnet 20 includes at least one first opening 21c, strength of the rotor 2 (specifically the main magnet 20) is lower than a rotor having no opening. In this embodiment, the nonmagnetic resin 24 is provided in each first opening 21c. Thus, magnetic resistance in each first opening 21c can be increased, and strength of the rotor 2 (specifically, the main magnet 20) can be increased. That is, the rotor 2 of the electric motor 1 according to this embodiment can reduce leakage flux in the rotor 2, and increase strength of the rotor 2.

In the rotor 2, leakage flux from the permanent magnets 22 easily flows to the downstream side of the rotor core 21 in the rotation direction of the rotor 2. Thus, in the case where each first opening 21c is disposed at the downstream side of the magnet insertion hole 21a in the rotation direction of the rotor 2, leakage flux can be more effectively reduced.

In addition, the main magnet 20 includes at least one indent part 21e, and the nonmagnetic resin 24 is provided in each indent part 21e. The nonmagnetic resin 24 in each indent part 21e is integrated with the nonmagnetic resin 24 in the first opening 21c, as one member. Accordingly, the plurality of cores 210 are firmly fixed in the axial direction. In particular, cores 210 located outside the magnet insertion hole 21a in the radial direction are firmly fixed in the axial direction. As a result, strength of the rotor 2 (specifically the main magnet 20) can be increased.

Although the nonmagnetic resin 24 disposed near the first opening 21c does not hinder a flow of magnetic flux contributing rotation of the rotor 2, the degree of influence on the flow of magnetic flux contributing to rotation of the rotor 2 increases as the flow of magnetic flux is separated from the first opening 21c. Thus, in this embodiment, the size of each indent part 21e gradually decreases in a direction away from the first opening 21c in the circumferential direction. As a result, the nonmagnetic resin 24 provided in each indent part 21e firmly fixes the plurality of cores 210 in the axial direction and does not hinder rotation of the rotor 2.

In addition, as illustrated in FIG. 6, in a case where the flat surface 21f defining each indent part 21e is formed linearly, the indent part 21e can be easily filled with the nonmagnetic resin 24. Accordingly, the indent part 21e is sufficiently filled with the nonmagnetic resin 24, and thus, the plurality of cores 210 can be firmly fixed in the axial direction.

As illustrated in FIG. 4, the main magnet 20 may include at least one additional nonmagnetic resin 24 disposed outside the rotor core 21 (i.e., the plurality of cores 210) in the axial direction. In this case, the nonmagnetic resin 24 in each first opening 21c and the at least one additional nonmagnetic resin 24 provided outside the rotor core 21 are integrated as one member. The nonmagnetic resin 24 in each first opening 21c will also be referred to as a first nonmagnetic resin, and the additional nonmagnetic resin 24 disposed outside the rotor core 21 (i.e., the plurality of cores 210) in the axial direction will also be referred to as a second nonmagnetic resin.

The nonmagnetic resin 24 disposed outside the rotor core 21 in the axial direction can fix the position of the permanent magnet 22 in the magnet insertion hole 21a. Accordingly, vibrations of the permanent magnet 22 during rotation of the rotor 2 can be prevented. As a result, noise of the electric motor 1 can be reduced during rotation of the rotor 2.

In the example illustrated in FIG. 4, the nonmagnetic resins 24 integrated as one member are disposed at both sides of the rotor core 21 in the axial direction. In this case, the nonmagnetic resin 24 in each first opening 21c and the integrated nonmagnetic resins 24 at both sides of the rotor core 21 are integrated as one member. In this case, the integrated nonmagnetic resins 24 at both sides of the rotor core 21 in the axial direction can fix the position of the permanent magnet 22 in the magnet insertion hole 21a. Accordingly, vibrations of the permanent magnet 22 during rotation of the rotor 2 can be more effectively prevented. As a result, noise of the electric motor 1 can be more effectively reduced during rotation of the rotor 2.

First Variation

Figure 7:
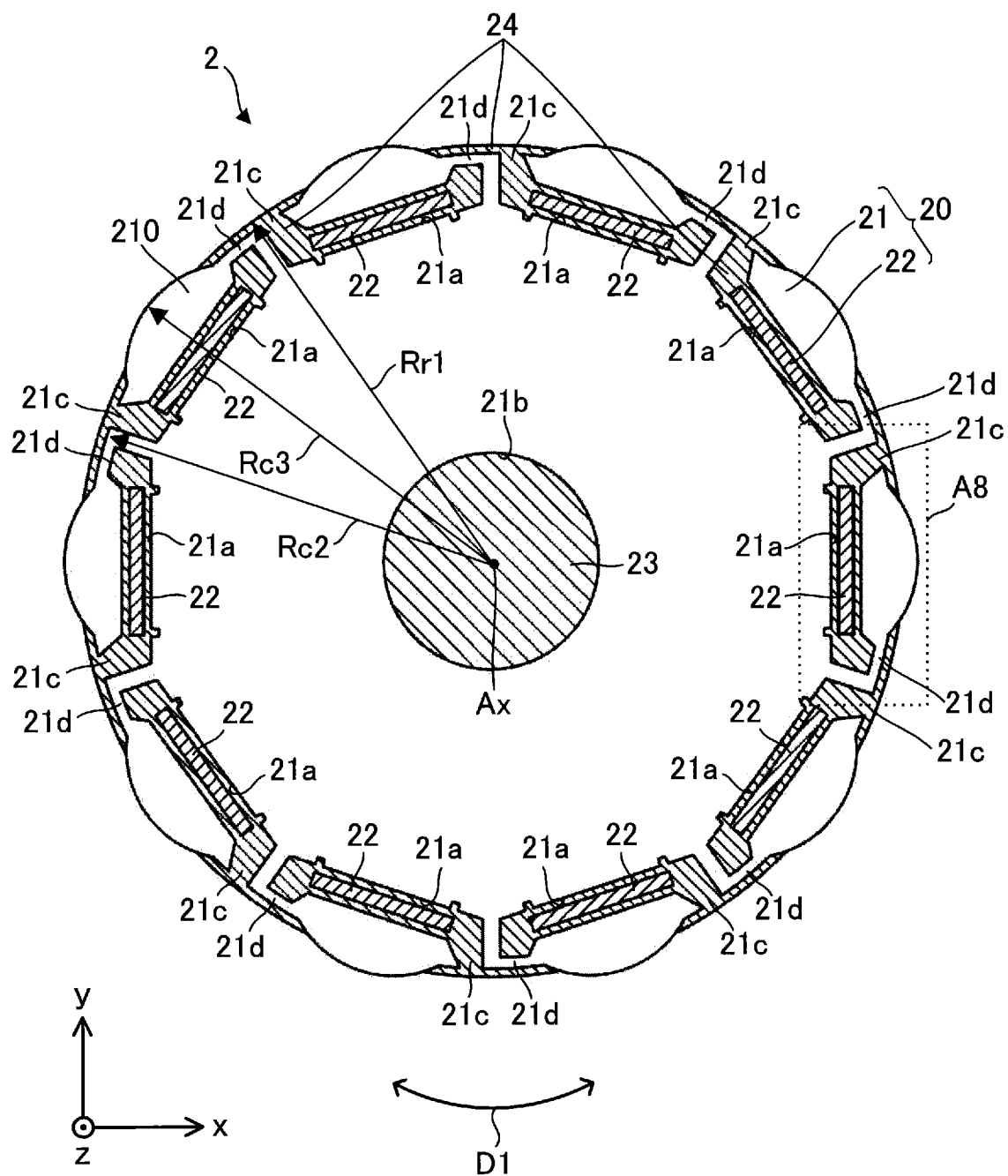
FIG. 7 is a diagram illustrating another example of the rotor.

FIG. 7 is a diagram illustrating another example of the rotor 2.

Figure 8:
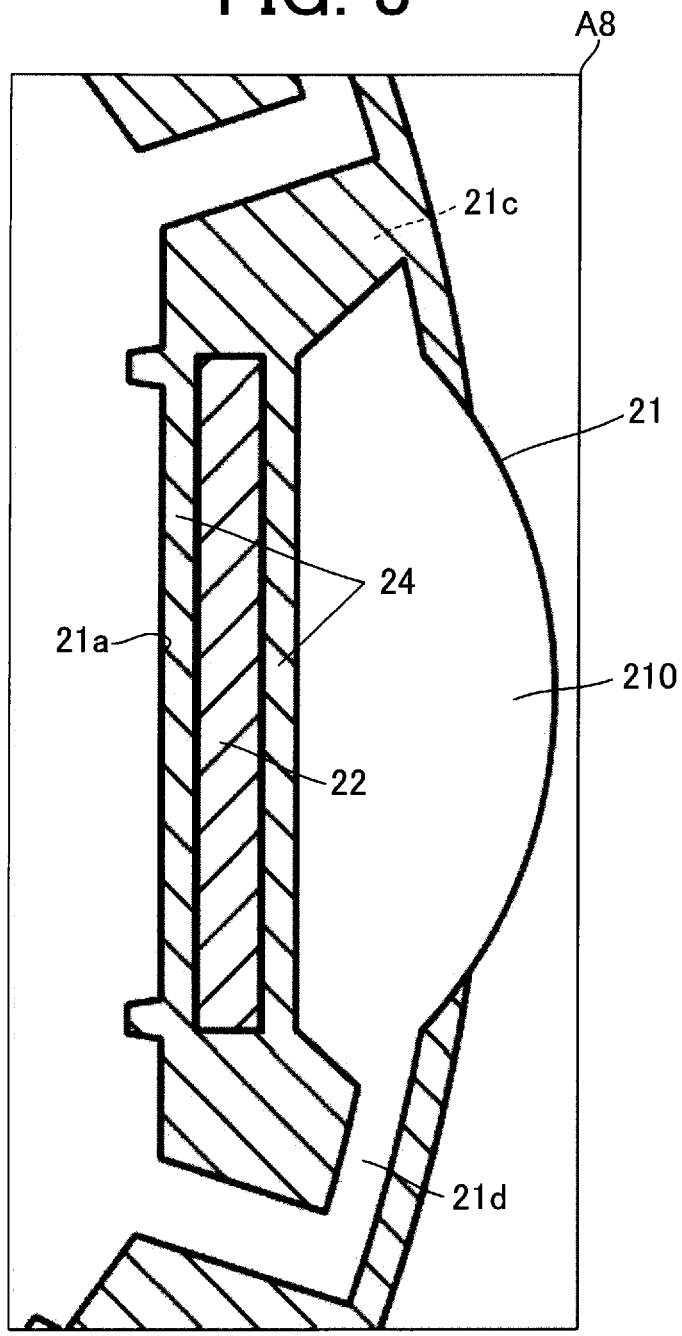
FIG. 8 is an enlarged view illustrating an area A8 shown in FIG. 7.

FIG. 8 is an enlarged view illustrating an area A8 shown in FIG. 7.

In a first variation, an end face of each permanent magnet 22 in the radial direction is in contact with the nonmagnetic resin 24 in the magnet insertion hole 21a. It is sufficient that at least one end face of each permanent magnet 22 in the radial direction is in contact with the nonmagnetic resin 24 in the magnet insertion hole 21a.

In particular, the inner end face of each permanent magnet 22 in the radial direction is in contact with the nonmagnetic resin 24 in the magnet insertion hole 21a, the outer end face of each permanent magnet 22 in the radial direction does not need to be in contact with the nonmagnetic resin 24. In this case, a magnetic force of each permanent magnet 22 can be effectively used.

In the example illustrated in FIGS. 7 and 8, both end faces of each permanent magnet 22 in the radial direction are in contact with the nonmagnetic resin 24 in the magnet insertion hole 21a. Thus, in the example illustrated in FIGS. 7 and 8, each permanent magnet 22 is covered with the nonmagnetic resin 24. In this case, the nonmagnetic resin 24 can firmly fix the position of the permanent magnet 22 in the magnet insertion hole 21a. Accordingly, vibrations of the permanent magnet 22 during rotation of the rotor 2 can be more effectively prevented. As a result, collision of the permanent magnet 22 against the rotor core 21 can be more effectively prevented during rotation of the rotor 2 and consequently noise of the electric motor 1 can be more effectively reduced.

Second Variation

Figure 9:
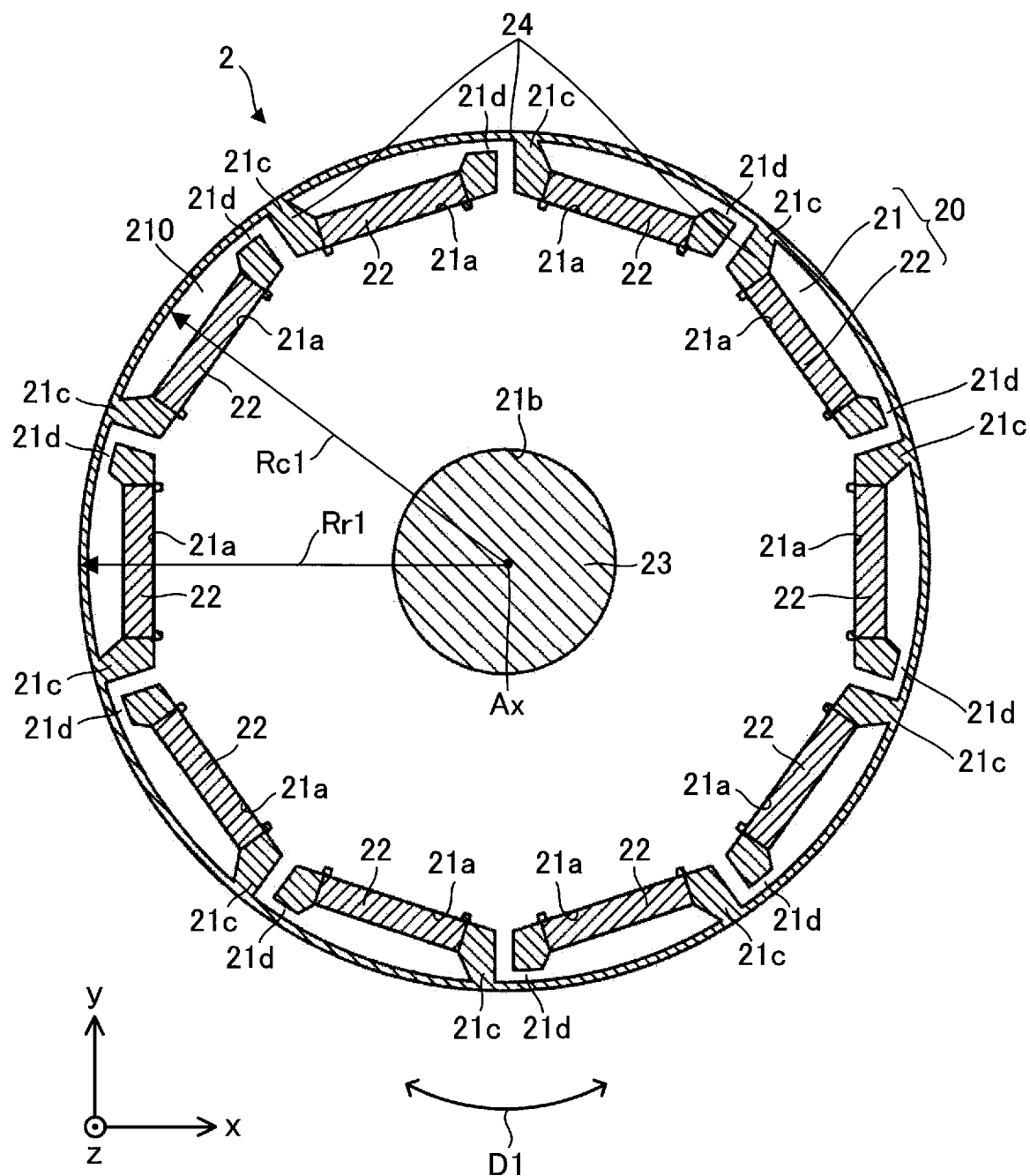
FIG. 9 is a cross-sectional view illustrating yet another example of the rotor.

FIG. 9 is a cross-sectional view illustrating yet another example of the rotor 2.

In a second variation, the rotor 2 satisfies Rr1>Rc1, where Rc1 is a maximum radius of the rotor core 21 (i.e., the plurality of cores 210), and Rr1 is a maximum radius of the nonmagnetic resin 24. Thus, the outer peripheral surface of the rotor core 21 is covered with the nonmagnetic resin 24. Accordingly, the rotor core 21 can be firmly fixed in the radial direction. As a result, strength of the rotor 2 (specifically the main magnet 20) can be increased.

Third Variation

Figure 10:
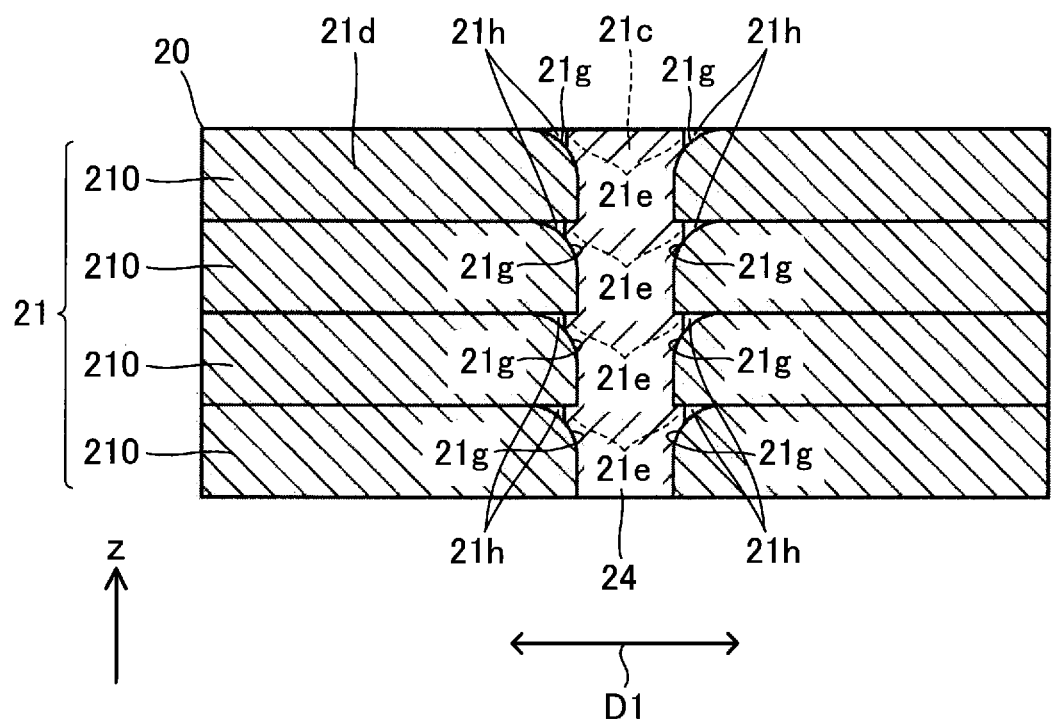
FIG. 10 is a cross-sectional view illustrating another example of a rotor core.

FIG. 10 is a cross-sectional view illustrating another example of the rotor core 21. The position of the cross section in FIG. 10 corresponds to the position of the cross section taken along line C6-C6 in FIG. 5.

In a third variation, the rotor core 21 includes at least one curved surface 21g, instead of each flat surface 21f illustrated in FIG. 6. Each curved surface 21g tilts toward the first opening 21c along the surface of the core 210. In other words, each curved surface 21g tilts with respect to the axial direction (z direction in FIG. 10), and also tilts with respect to the direction orthogonal to the axial direction. For example, each curved surface 21g forms a quadric curve in a cross section shown in FIG. 10.

In the third variation, the volume of the rotor core 21 can be increased as compared to the rotor core 21 shown in FIG. 6, and thus, a magnetic force of the rotor 2 can be increased.

In addition, in the third variation, the rotor core 21 includes at least one space 21h. Each space 21h communicates with the corresponding indent part 21e. The nonmagnetic resin 24 is not provided in each space 21h. In this case, the nonmagnetic resin 24 in each indent part 21e is integrated with the nonmagnetic resin 24 in the first opening 21c as one member. Accordingly, the plurality of cores 210 can be firmly fixed in the axial direction. In particular, the cores 210 located outside the magnet insertion hole 21a in the radial direction are firmly fixed in the axial direction. As a result, strength of the rotor 2 (specifically the main magnet 20) can be increased. In addition, since the nonmagnetic resin 24 does not need to be provided in each space 21h of the rotor core 21, the amount of the nonmagnetic resin 24 can be reduced and consequently costs for the rotor 2 can be reduced.

Fourth Variation

Figure 11:
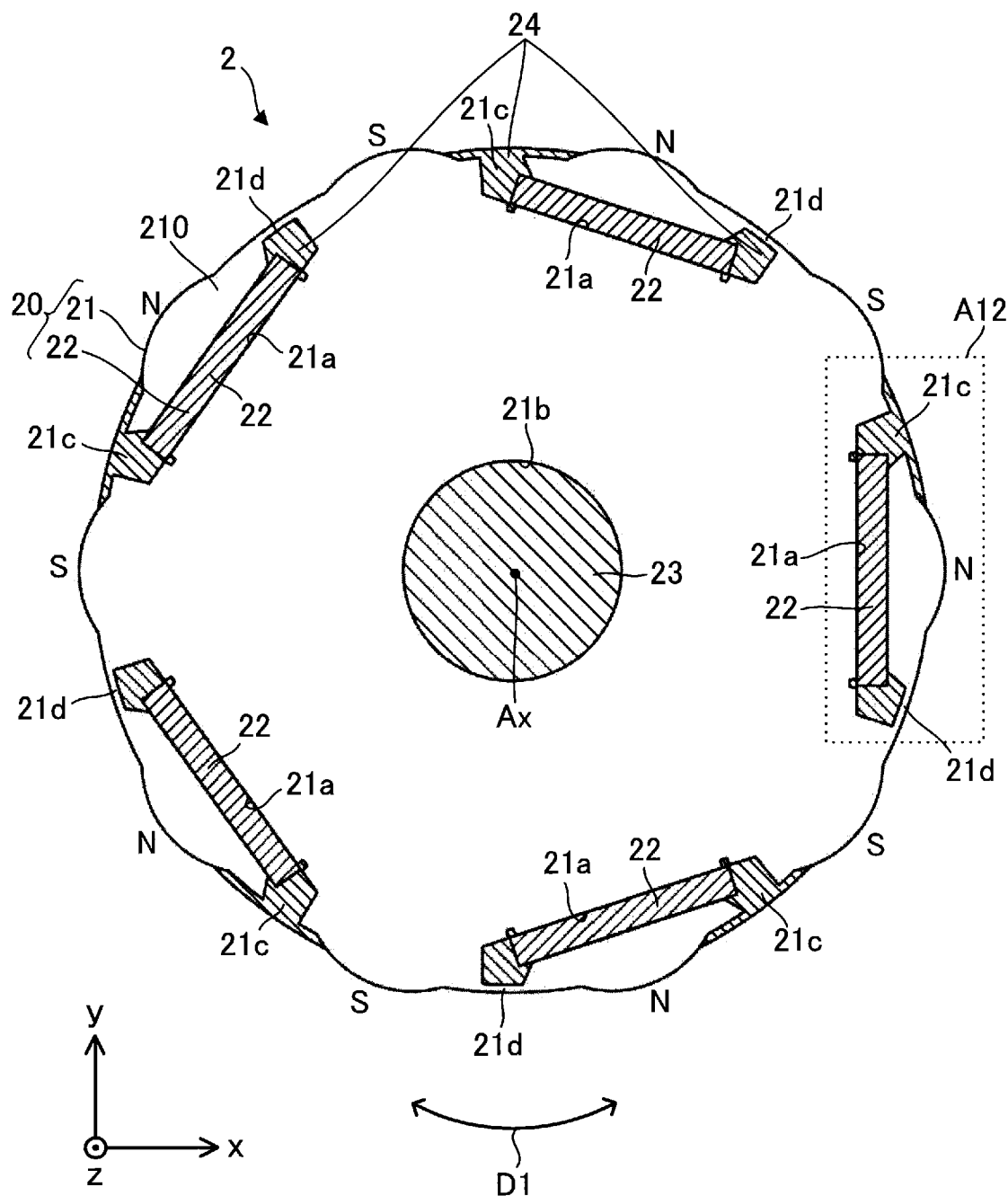
FIG. 11 is a cross-sectional view illustrating still another example of the rotor.

FIG. 11 is a cross-sectional view illustrating yet another example of the rotor 2. In FIG. 11, "N" represents a north pole of the rotor 2 (specifically a north pole functioning to the stator 3), and "S" represents a south pole of the rotor 2 (specifically a south pole functioning to the stator 3).

In a fourth variation, the rotor 2 is a consequent pole rotor. That is, in the fourth variation, each permanent magnet 22 forms a north pole as a first magnetic pole of the rotor 2 (specifically the main magnet 20). In addition, each permanent magnet 22 (specifically magnetic flux from the permanent magnet 22) forms a south pole as a second magnetic pole that is a pseudo-magnetic pole of the rotor 2. That is, a part of the rotor core 21 (i.e., the plurality of cores 210) adjacent to the permanent magnets 22 in the circumferential direction forms a second magnetic pole having a polarity different from that of the first magnetic pole.

Thus, in the main magnet 20, a region including the permanent magnet 22 (which will be referred to as a first region) functions as one magnetic pole (e.g., a magnetic pole serving as a north pole to the stator 3), and a region between permanent magnets 22 adjacent to each other in the circumferential direction (which will be referred to as a second region) functions as another magnetic pole (e.g., a pseudo-magnetic pole serving as a south pole to the stator 3).

In the fourth variation, the number of permanent magnets 22 is a half of the number n (where n is an even number greater than or equal to four) of magnetic poles of the rotor 2. The number n of magnetic poles of the rotor 2 is the sum of the number of magnetic poles functioning as north poles to the stator 3 and the number of magnetic poles functioning as south poles to the stator 3. The north poles and the south poles of the rotor 2 are alternately arranged in the circumferential direction of the rotor 2. In the example illustrated in FIG. 11, n=10.

Since the rotor 2 in the fourth variation is a consequent pole rotor, the number of magnet insertion holes 21a and first openings 21c can be reduced. For example, the number of magnet insertion holes 21a and first openings 21c of the rotor 2 in the fourth variation is a half of the number of magnet insertion holes 21a and first openings 21c of the rotor 2 shown in FIG. 3. Accordingly, strength of the rotor 2 in the fourth variation can be higher than that of the rotor 2 illustrated in FIG. 3.

Figure 12:
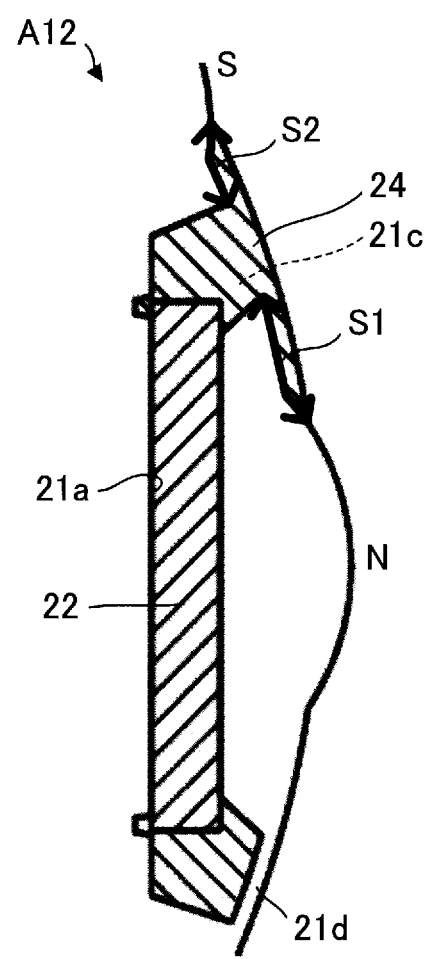
FIG. 12 is an enlarged view illustrating an area A12 shown in FIG. 11.

FIG. 12 is an enlarged view illustrating an area A12 shown in FIG. 11.

The rotor 2 satisfies S1>S2, where S1 is a surface area of an outer peripheral surface of a north pole as a first magnetic pole that is in contact with the nonmagnetic resin 24, and S2 is a surface area of an outer peripheral surface of a south pole as the second magnetic pole that is in contact with the nonmagnetic resin 24. In FIGS. 11 and 12, the outer peripheral surface of a north pole means the outer peripheral surface of the stator core 21 in the north pole, and the outer peripheral surface of a south pole means the outer peripheral surface of the stator core 21 in the south pole.

In the rotor 2 according to the fourth variation, since each pseudo-magnetic pole as the second magnetic pole includes none of the magnet insertion hole 21a and the first opening 21c, the rotor core 21 in each pseudo-magnetic pole as the second magnetic pole has a sufficient strength. Thus, the outer peripheral surface of each pseudo-magnetic pole as the second magnetic pole does not need to be in contact with a large amount of nonmagnetic resin 24. If the rotor 2 satisfies S1>S2, the amount of the nonmagnetic resin 24 in contact with each pseudo-magnetic pole as the second magnetic pole having a sufficient strength can be reduced and consequently costs for the rotor 2 can be reduced.

Fifth Variation

Figure 13:
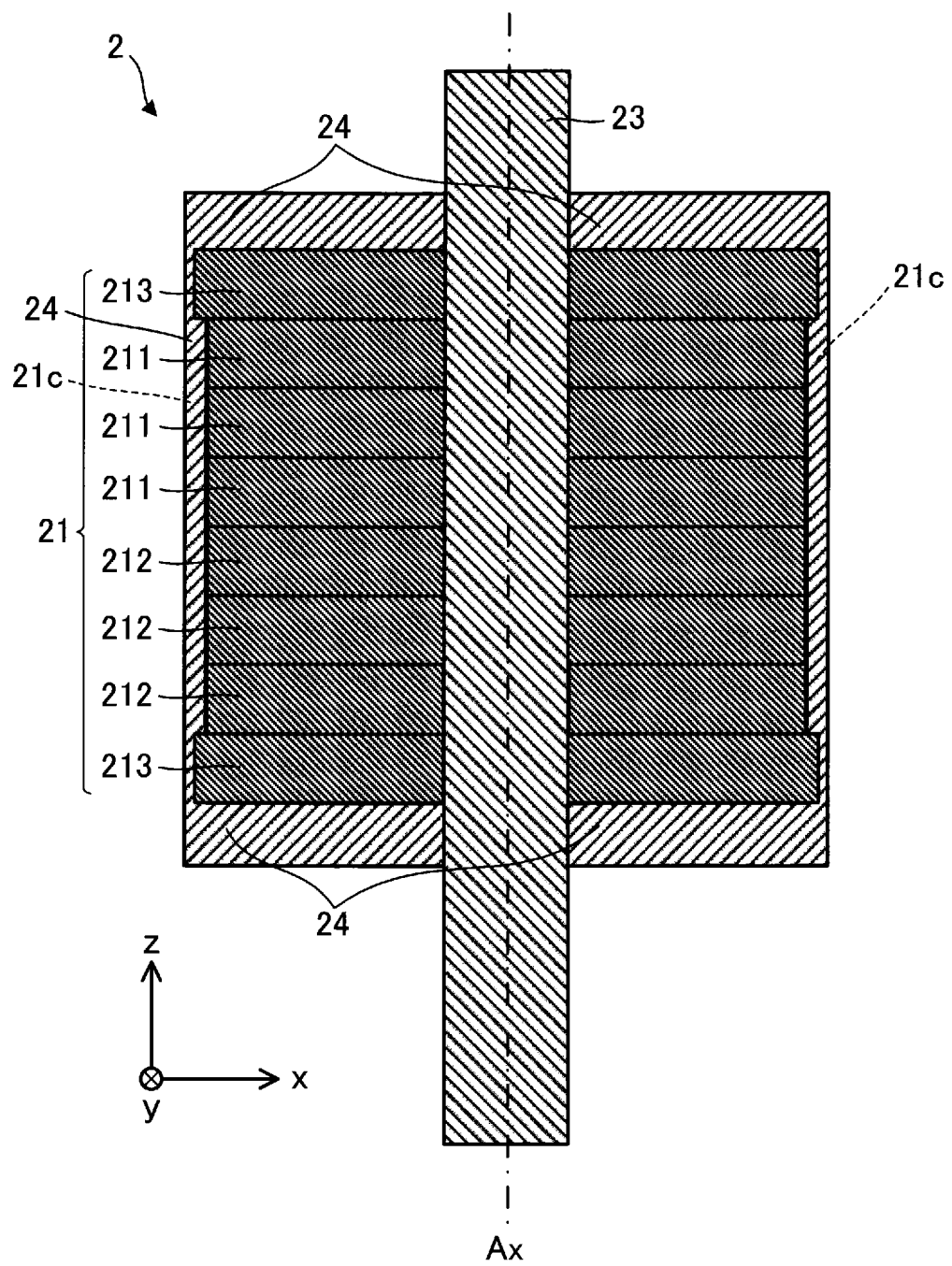
FIG. 13 is a cross-sectional view illustrating still another example of the rotor.

FIG. 13 is a cross-sectional view illustrating yet another example of the rotor 2.

In a fifth variation, the rotor 2 includes a plurality of first cores 211, a plurality of second cores 212, and a plurality of third cores 213. In the fifth variation, the rotor core 21 is constituted by the plurality of first cores 211, the plurality of second cores 212, and the plurality of third cores 213. The plurality of first cores 211, the plurality of second cores 212, and the plurality of third cores 213 are stacked in the axial direction. The third cores 213 are stacked at both ends of the plurality of cores 211 and 212. In other words, the third cores 213 are disposed at both ends of the rotor core 21. The plurality of first cores 211 and the plurality of second cores 212 are disposed at locations other than both ends of the rotor core 21.

Arrangement of the plurality of first cores 211 and the plurality of second cores 212 in the axial direction is not limited to the example illustrated in FIG. 13. For example, the first cores 211 and the second cores 212 may be alternately arranged in the axial direction.

Figure 14:
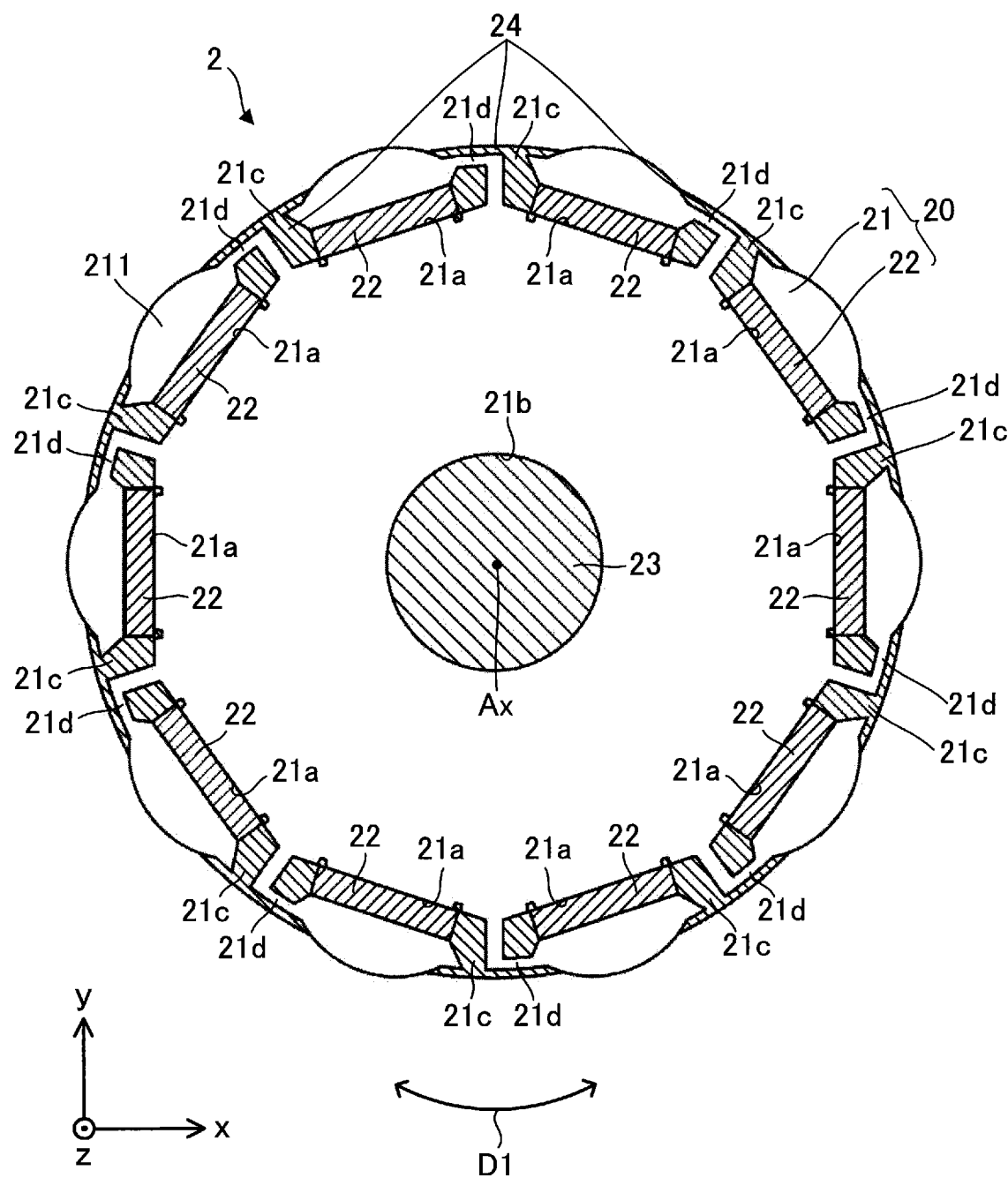
FIG. 14 is a cross-sectional view schematically illustrating a structure of a first core shown in FIG. 13.

FIG. 14 is a cross-sectional view schematically illustrating a structure of the first core 211 shown in FIG. 13.

Figure 15:
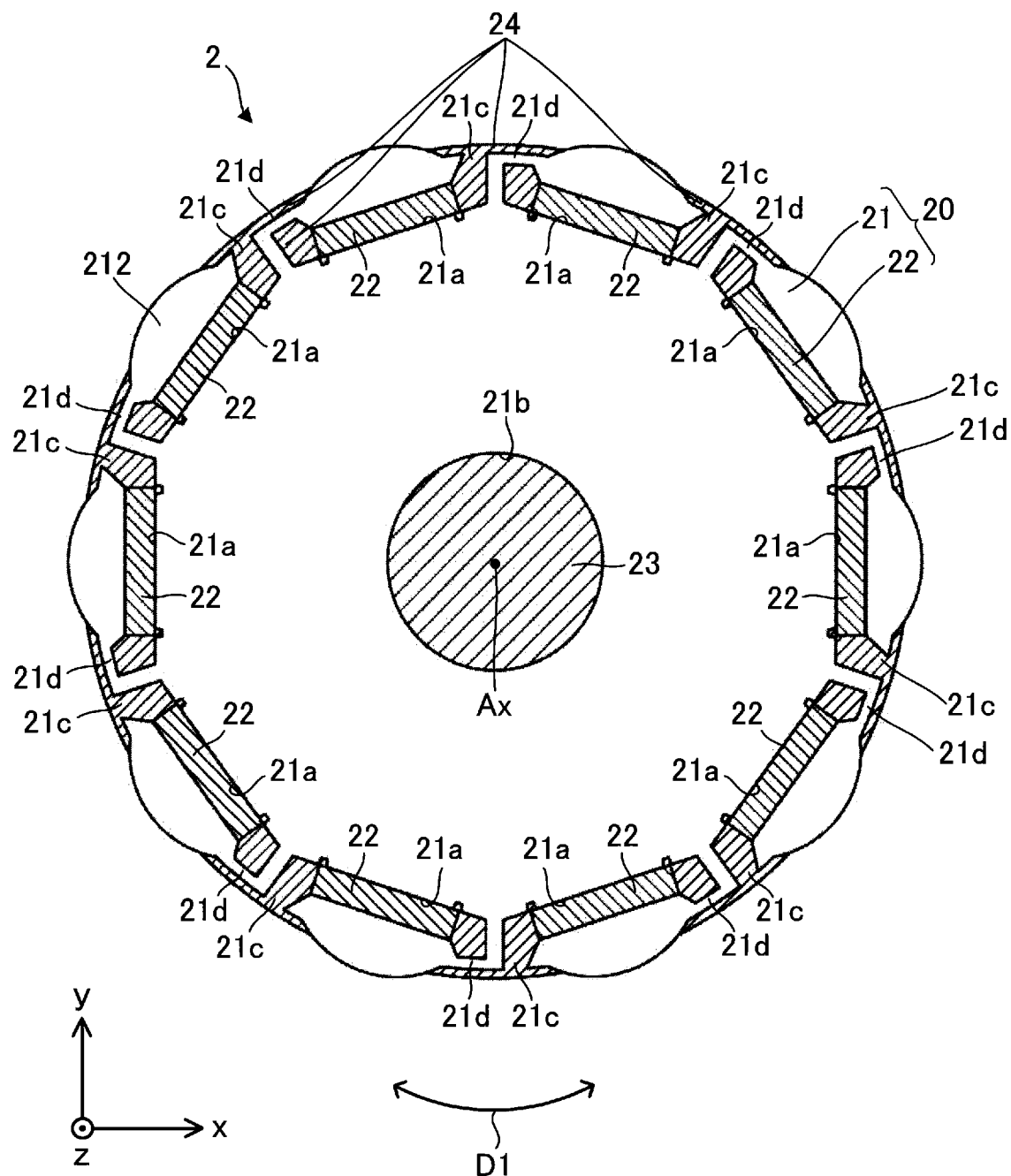
FIG. 15 is a cross-sectional view schematically illustrating a structure of a second core shown in FIG. 13.

FIG. 15 is a cross-sectional view schematically illustrating a structure of the second core 212 shown in FIG. 13.

Figure 16:
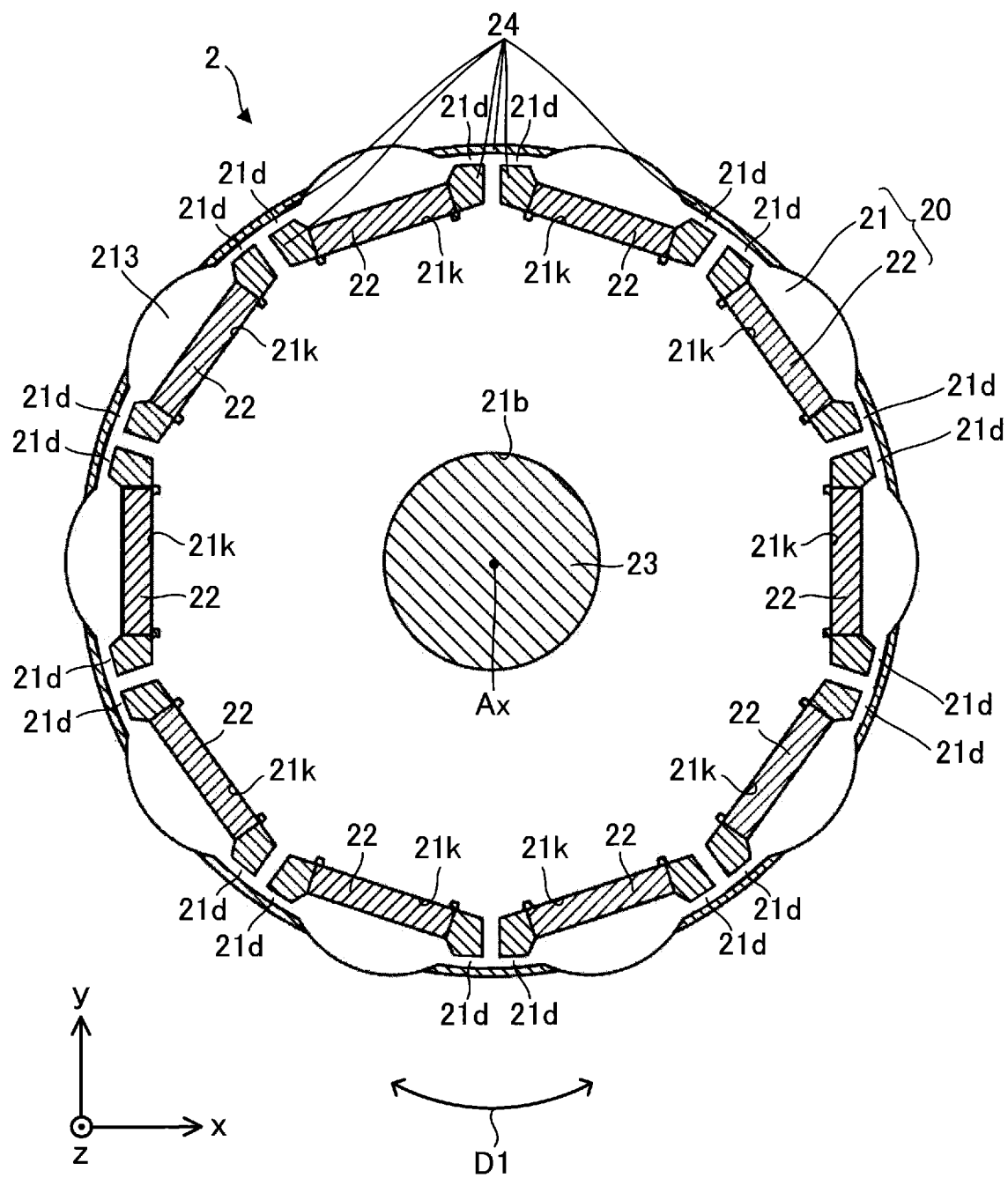
FIG. 16 is a cross-sectional view schematically illustrating a structure of a third core shown in FIG. 13.

FIG. 16 is a cross-sectional view schematically illustrating a structure of the third core 213 shown in FIG. 13.

Each of the first cores 211 is the same as the core 210 illustrated in FIG. 3. Thus, each first core 211 includes at least one first opening 21c. Each first opening 21c of the first cores 211 communicates with the downstream side of the magnet insertion hole 21a in the rotation direction of the rotor 2.

Each of the second cores 212 includes at least one first opening 21c. Each first opening 21c of the second cores 212 communicates with the upstream side of the magnet insertion hole 21a in the rotation direction of the rotor 2. Each magnet insertion hole 21a and the shaft hole 21b of each second core 212 communicate with each magnet insertion hole 21a and the shaft hole 21b of each first core 211.

Each of the third cores 213 includes a hole 21k as at least one magnet insertion hole. Each hole 21k communicates with the magnet insertion hole 21a of each first core 211 and the magnet insertion hole 21a of each second core 212. Thus, the permanent magnet 22 is also disposed in each hole 21k.

Each of the third cores 213 is not provided with the first opening 21c. Thus, in the xy plane, each hole 21k of the third cores 213 does not communicate with the outside of the main magnet 20. That is, in the xy plane, the outer periphery of each hole 21k is closed by the third core 213 (specifically the first closing part 21d).

In the rotor 2, in a case where the first opening 21c is provided only at one end of the magnet insertion hole 21a in the rotation direction of the rotor 2, the structure of the rotor core 21 is asymmetric between the rotation direction and the counter-rotation direction. In this case, noise might increase during rotation of the rotor 2. In view of this, in the fifth variation, the rotor 2 includes the plurality of first cores 211 having the first openings 21c communicating with the downstream side of the magnet insertion holes 21a in the rotation direction, and the plurality of second cores 212 having the first openings 21c communicating with the upstream side of the magnet insertion holes 21a in the rotation direction. Thus, the roto 2 can be balanced as a whole between the rotation direction and the counter-rotation direction and consequently noise can be reduced during rotation of the rotor 2.

Since the third cores 213 have no first openings 21c, the third cores 213 have high strength. Thus, in the case where the third cores 213 are stacked at both ends of the plurality of cores 211 and 212, strength of the entire rotor 2 can be increased. In particular, strength of the rotor 2 in the axial direction can be increased.

Sixth Variation

Figure 17:
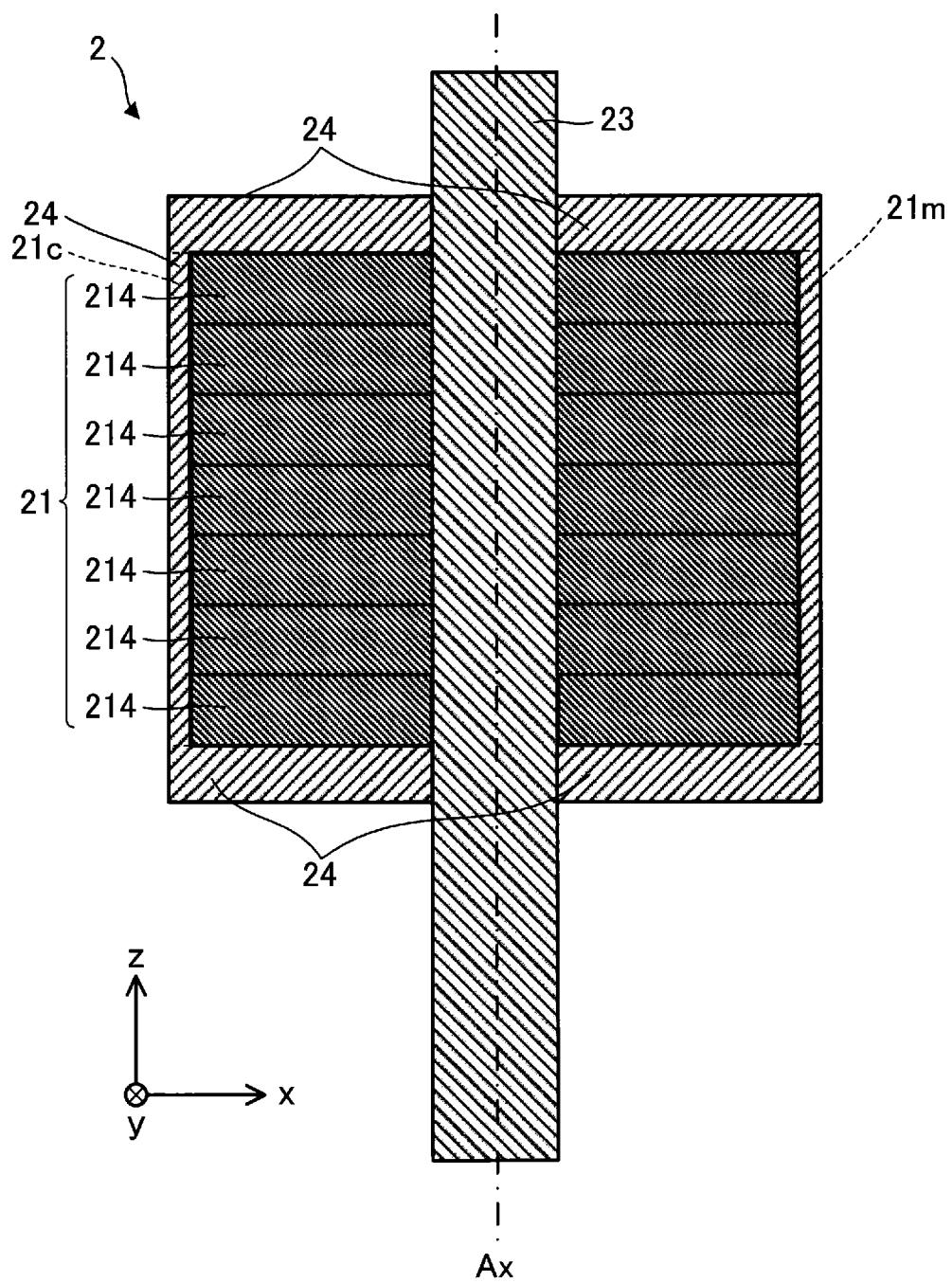
FIG. 17 is a cross-sectional view illustrating still another example of the rotor.
Figure 18:
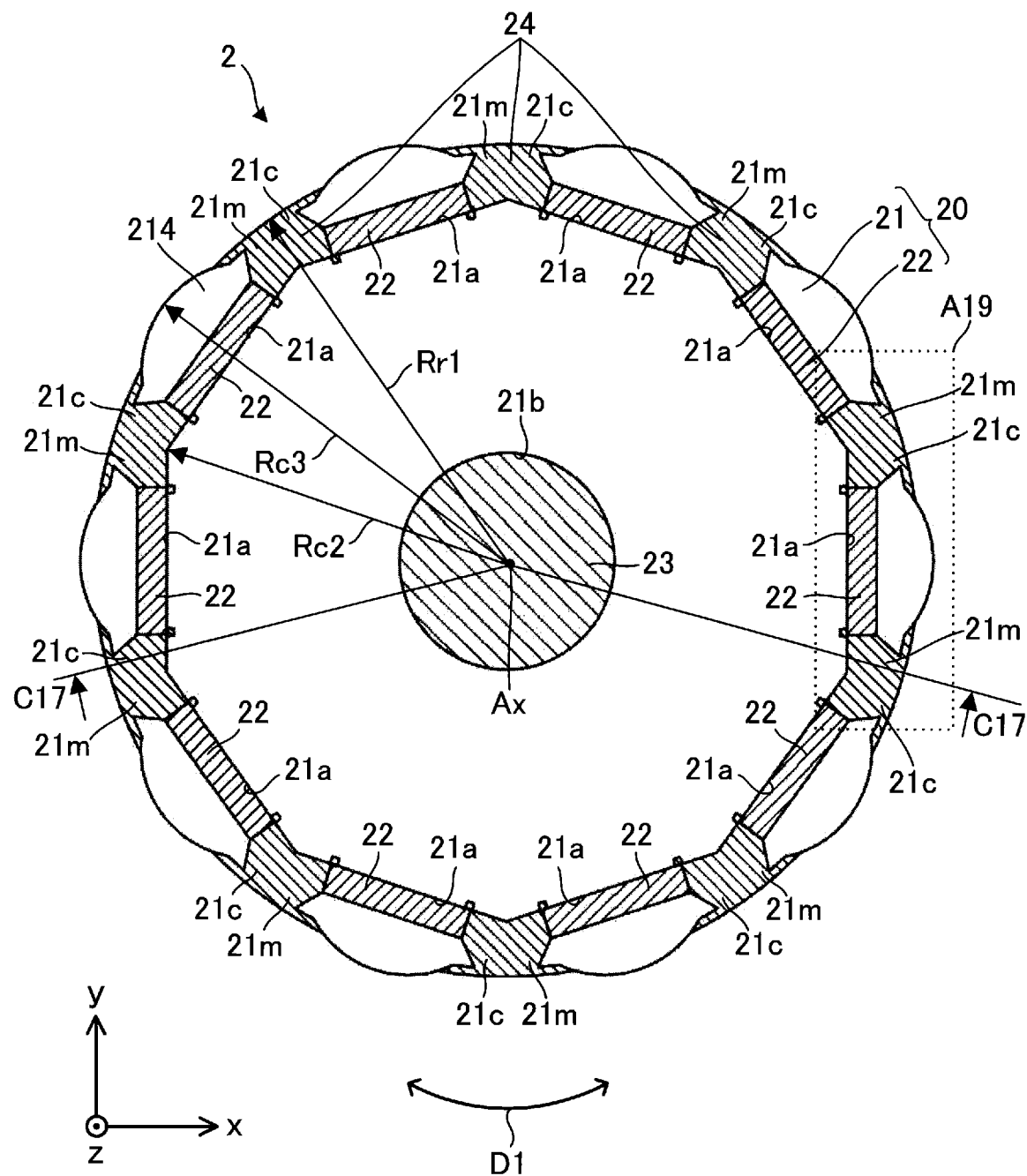
FIG. 18 is a cross-sectional view illustrating still another example of the rotor.

FIGS. 17 and 18 are cross-sectional views illustrating yet another example of the rotor 2. FIG. 17 is a cross-sectional view taken along line C17-C17 in FIG. 18.

Figure 19:
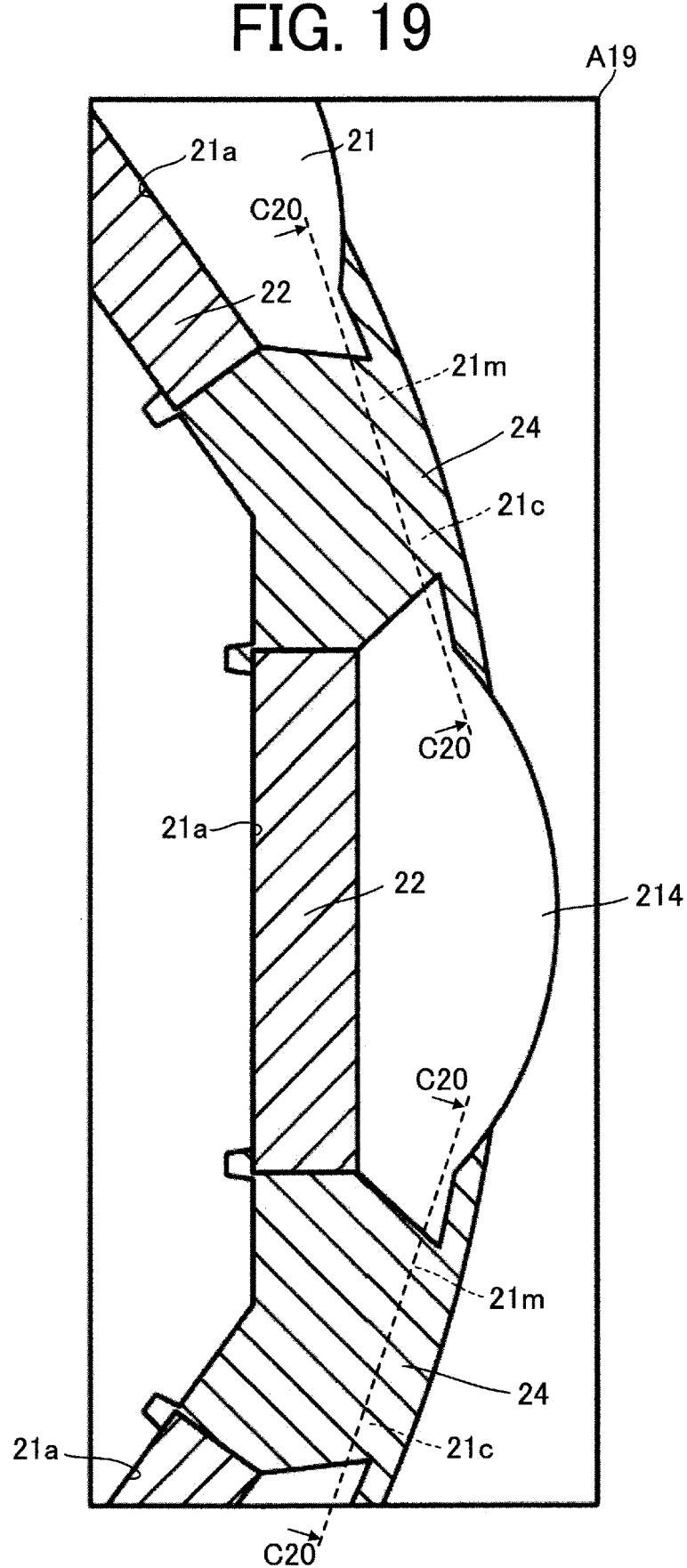
FIG. 19 is an enlarged view illustrating an area A19 shown in FIG. 18.

FIG. 19 is an enlarged view illustrating an area A19 shown in FIG. 18.

In a sixth variation, the rotor 2 includes a plurality of cores 214, instead of the plurality of cores 210 shown in FIG. 3. That is, in the sixth variation, the rotor core 21 are constituted by the plurality of cores 214.

In the sixth variation, the rotor 2 includes no first closing part 21d, and includes at least one second opening 21m. That is, each of the plurality of cores 214 includes at least one first opening 21c and at least one second opening 21m. It is sufficient that at least one of the plurality of cores 214 includes no first closing part 21d and includes at least one first opening 21c and at least one second opening 21m communicating with the first opening 21c.

Each first opening 21c communicates with one end of the magnet insertion hole 21a in the circumferential direction. Each second opening 21m communicates with the other end of the magnet insertion hole 21a in the circumferential direction. Each second opening 21m communicates with its adjacent first opening 21c. Accordingly, in the xy plane, both ends of the magnet insertion hole 21a in the circumferential direction communicates with the outside of the main magnet 20. The nonmagnetic resin 24 is also provided in each second opening 21m, in addition to each first opening 21c and each indent part 21e.

In the sixth variation, at least one of the plurality of cores 214 includes no first closing part 21d and includes at least one first opening 21c and at least one second opening 21m. Thus, leakage flux in the rotor 2 can be more effectively reduced.

Figure 20:
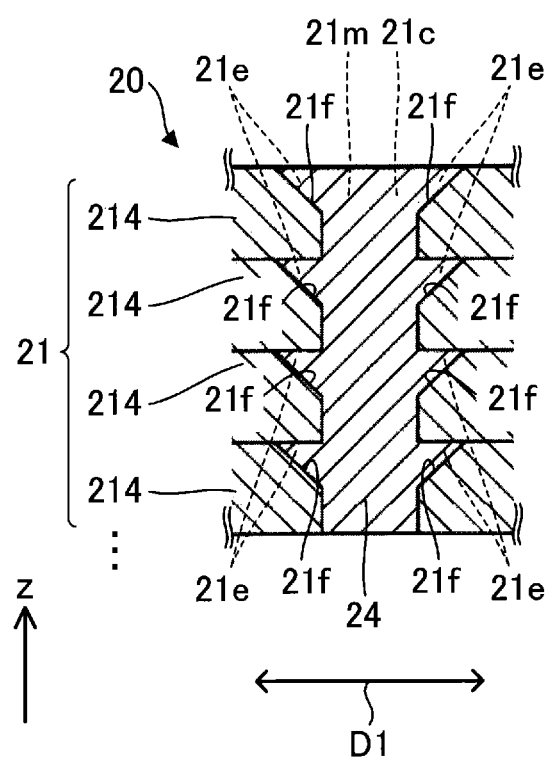
FIG. 20 is a cross-sectional view taken along line C20-C20 in FIG. 19.

FIG. 20 is a cross-sectional view taken along line C20-C20 in FIG. 19.

Each flat surface 21f and each indent part 21e of the rotor core 21 shown in FIG. 20 are respectively the same as each flat surface 21f and each indent part 21e shown in FIG. 6. As illustrated in FIG. 20, the nonmagnetic resin 24 is provided in each first opening 21c, each second opening 21m, and each indent part 21e. Accordingly, the plurality of cores 214 can be firmly fixed in the axial direction. In particular, the cores 214 located outside the magnet insertion hole 21a in the radial direction are firmly fixed in the axial direction. As a result, strength of the rotor 2 (specifically the main magnet 20) can be increased.

The cross-sectional structure of the third variation may be applied to the cross-sectional structure taken along line C20-C20 in FIG. 19. For example, the rotor core 21 illustrated in FIG. 20 may have the curved surface 21g shown in FIG. 10, instead of the flat surface 21f.

As illustrated in FIG. 17, in the sixth variation, the main magnet 20 may include at least one additional nonmagnetic resin 24 disposed outside the rotor core 21 (i.e., the plurality of cores 214) in the axial direction. In this case, the nonmagnetic resin 24 in each first opening 21c and the at least one additional nonmagnetic resin 24 disposed outside the rotor core 21 and in the second opening 21m are integrated as one member.

In the example illustrated in FIG. 17, the nonmagnetic resins 24 integrated as one member are disposed at both sides of the rotor core 21 in the axial direction. In this case, the nonmagnetic resin 24 in each first opening 21c and each second opening 21m and the integrated nonmagnetic resins 24 at both sides of the rotor core 21 are integrated as one member. In this case, the integrated nonmagnetic resins 24 at both sides of the rotor core 21 in the axial direction can fix the position of the permanent magnet 22 in the magnet insertion hole 21a. Accordingly, vibrations of the permanent magnet 22 during rotation of the rotor 2 can be more effectively prevented. As a result, noise of the electric motor 1 can be more effectively reduced during rotation of the rotor 2.

In addition, the integrated nonmagnetic resins 24 can increase strength of the entire rotor 2. In particular, the integrated nonmagnetic resins 24 can increase strength of the rotor 2 in the axial direction. For example, the integrated nonmagnetic resins 24 can firmly fix, in the axial direction, the cores 214 disposed outside the magnet insertion hole 21a in the radial direction.

Seventh Variation

Figure 21:
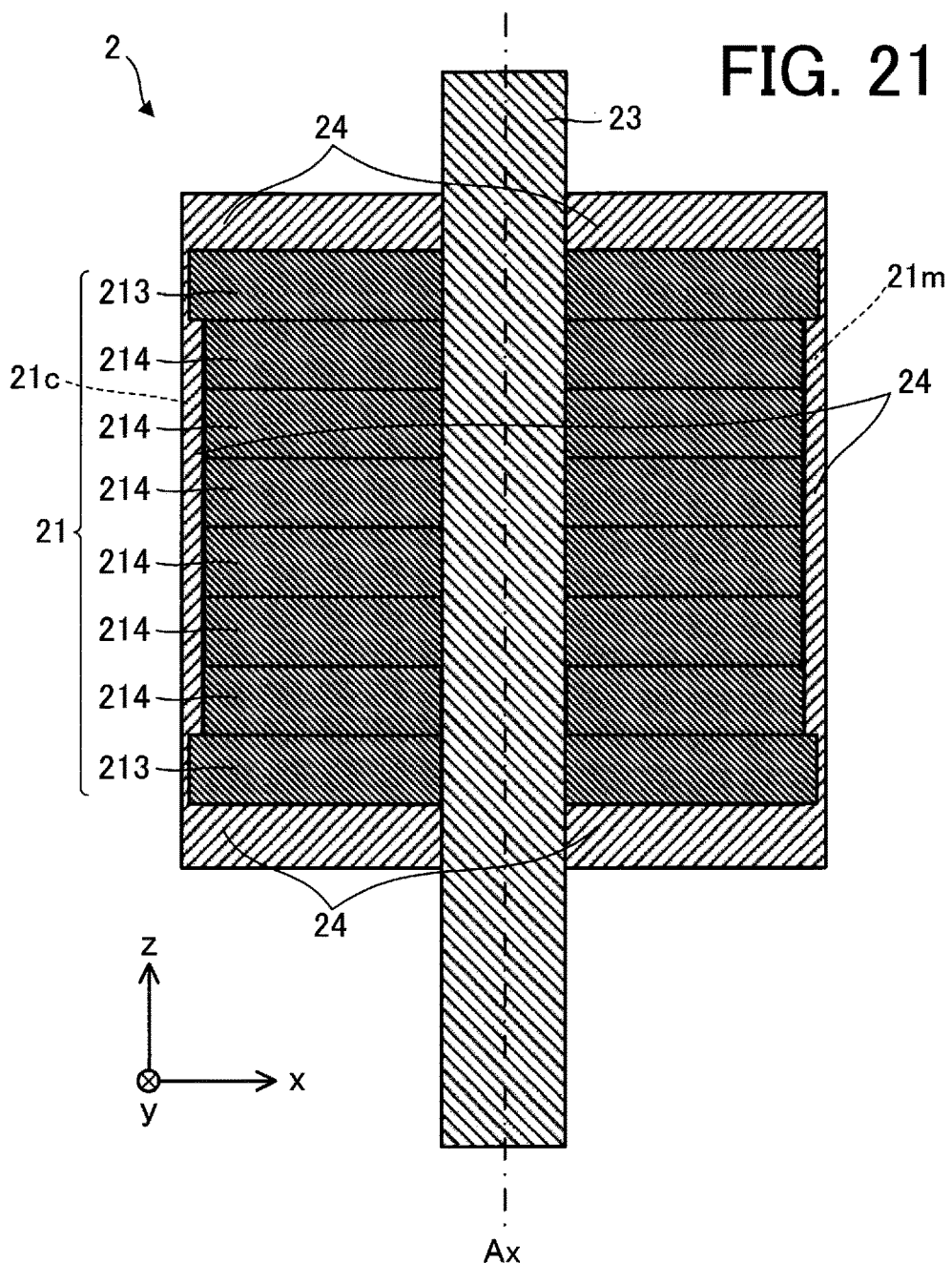
FIG. 21 is a cross-sectional view illustrating still another example of the rotor.

FIG. 21 is a cross-sectional view illustrating yet another example of the rotor 2.

In a seventh variation, the rotor 2 includes a plurality of cores 214 and a plurality of cores 213. In the seventh variation, the rotor core 21 are constituted by the plurality of cores 214 and the plurality of cores 213. In the seventh variation, each core 214 will also be referred to as a first core 214, and each core 213 will also be referred to as a second core 213. Each first core 214 in the seventh variation is the same as the core 214 in the sixth variation, and each second core 213 in the seventh variation is the same as the third core 213 in the fifth variation.

The plurality of first cores 214 and the plurality of second cores 213 are stacked in the axial direction. The second cores 213 are stacked at both ends of the plurality of first core 214. In other words, the second cores 213 disposed at both ends of the rotor core 21. The plurality of first cores 214 are disposed at locations other than both ends of the rotor core 21.

The rotor 2 in the seventh variation has the advantages described in the sixth variation and the advantages described in the fifth variation.

The variations described above have the advantages described in the embodiment.

Second Embodiment

Figure 22:
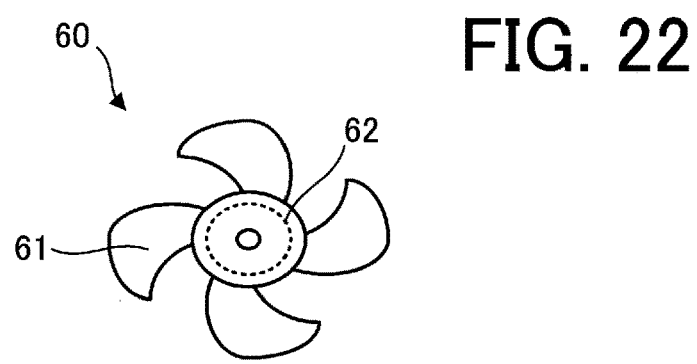
FIG. 22 is a diagram schematically illustrating a structure of a fan according to a second embodiment of the present invention.

FIG. 22 is a diagram schematically illustrating a structure of a fan 60 according to a second embodiment of the present invention.

The fan 60 includes blades 61 and an electric motor 62. The fan 60 is also referred to as a blower. The electric motor 62 is the electric motor 1 according to the first embodiment. The blades 61 are fixed to a shaft of the electric motor 62. The electric motor 62 drives the blades 61. Specifically, the electric motor 62 causes the blades 61 to rotate. When the electric motor 62 is driven, the blades 61 rotate to generate an airflow. Accordingly, the fan 60 can send air.

In the fan 60 according to the second embodiment, the electric motor 1 described in the first embodiment is applied to the electric motor 62, and thus, the same advantages as those described in the first embodiment can be obtained. In addition, a decrease in efficiency of the fan 60 can be prevented.

Third Embodiment

An air conditioner 50 (also referred to as a refrigerating air conditioner or a refrigeration cycle device) according to a third embodiment of the present invention will be described.

Figure 23:
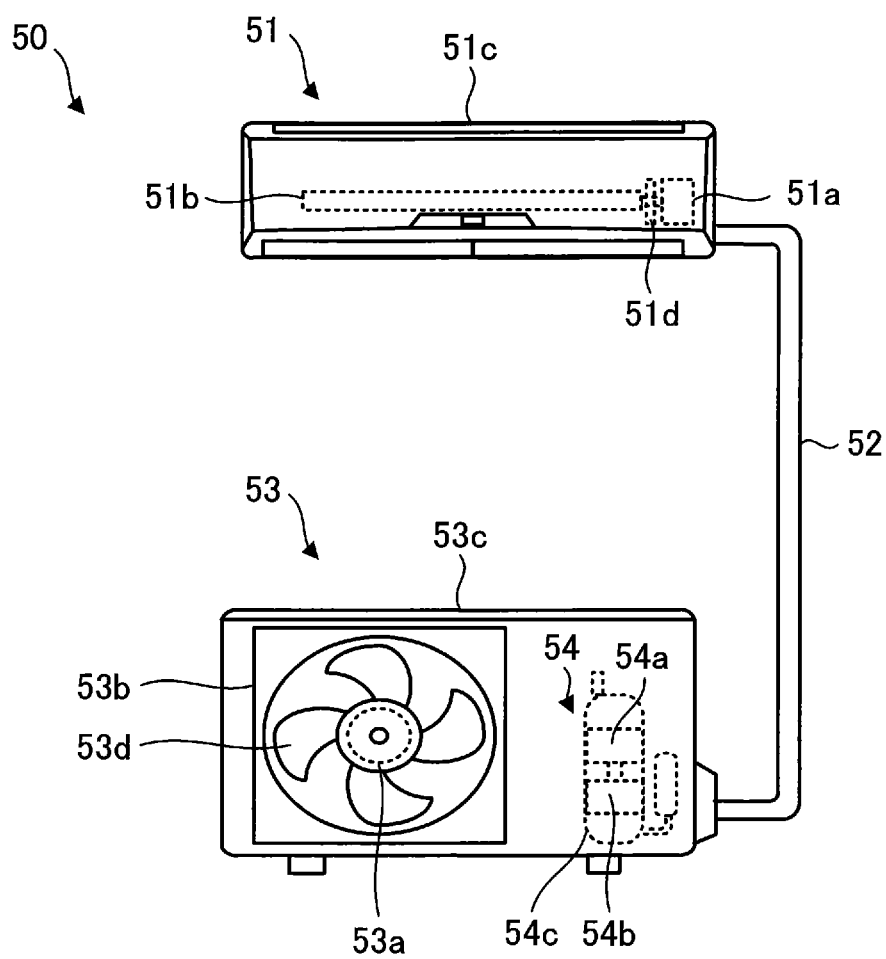
FIG. 23 is a diagram schematically illustrating a configuration of an air conditioner according to a third embodiment of the present invention.

FIG. 23 is a diagram schematically illustrating a configuration the air conditioner 50 according to the third embodiment.

The air conditioner 50 according to the third embodiment includes an indoor unit 51 as a blower (first blower), a refrigerant pipe 52, and an outdoor unit 53 as a blower (second blower) connected to the indoor unit 51. For example, the outdoor unit 53 is connected to the indoor unit 51 through a refrigerant pipe 52.

The indoor unit 51 includes an electric motor 51a (e.g., the electric motor 1 according to the first embodiment), an air blowing unit 51b that supplies air when being driven by the electric motor 51a, and a housing 51c covering the electric motor 51a and the air blowing unit 51b. The air blowing unit 51b includes, for example, blades 51d that are driven by the electric motor 51a. For example, the blades 51d are fixed to a shaft of the electric motor 51a, and generate an airflow.

The outdoor unit 53 includes an electric motor 53a (e.g., the electric motor 1 according to the second embodiment), an air blowing unit 53b, a compressor 54, and a heat exchanger (not shown). When the air blowing unit 53b is driven by the electric motor 53a, the air blowing unit 53b supplies air. The air blowing unit 53b includes, for example, blades 53d that are driven by the electric motor 53a. For example, the blades 53d are fixed to a shaft of the electric motor 53a, and generate an airflow. The compressor 54 includes an electric motor 54a (e.g., the electric motor 1 according to the first embodiment), a compression mechanism 54b (e.g., a refrigerant circuit) that is driven by the electric motor 54a, and a housing 54c covering the electric motor 54a and the compression mechanism 54b.

In the air conditioner 50, at least one of the indoor unit 51 or the outdoor unit 53 includes the electric motor 1 described in the first embodiment. That is, one or both of the indoor unit 51 and the outdoor unit 53 includes the electric motor 1 described in the first embodiment. Specifically, as a driving source of an air blowing unit, the electric motor 1 described in the first embodiment is applied to at least one of the electric motors 51a and 53a. That is, the electric motor 1 described in the first embodiment is applicable to one or both of the indoor unit 51 and the outdoor unit 53. The electric motor 1 described in the first embodiment may be applied to the electric motor 54a of the compressor 54.

The air conditioner 50 is capable of performing air conditioning such as a cooling operation of sending cold air from the indoor unit 51 and a heating operation of sending warm air from the indoor unit 51, for example. In the indoor unit 51, the electric motor 51a is a driving source for driving the air blowing unit 51b. The air supply unit 51b is capable of sending conditioned air.

In the air conditioner 50 according to the third embodiment, the electric motor 1 described in the first embodiment is applied to at least one of the electric motors 51a and 53a, and thus, the same advantages as those described in the first embodiment can be obtained. As a result, a decrease in efficiency of the air conditioning apparatus 50 can be prevented.

Furthermore, with the use of the electric motor 1 according to the first embodiment as a driving source of a blower (e.g., the indoor unit 51), the same advantages as those described in the first embodiment can be obtained. As a result, a decrease in air blower efficiency can be prevented. The blower including the electric motor 1 according to the first embodiment and the blades (e.g., the blades 51d or 53d) driven by the electric motor 1 can be used alone as a device for supplying air. This blower is also applicable to equipment other than the air conditioner 50.

Furthermore, in the case of using the electric motor 1 according to the first embodiment as a driving source of the indoor unit 54, the same advantages as those described in the first embodiment can be obtained. Further, a decrease in efficiency of the compressor 54 can be prevented.

The electric motor 1 described in the first embodiment can be mounted on equipment including a driving source, such as a ventilator, a household electrical appliance, or a machine tool, as well as the air conditioner 50.

Features of the embodiments and features of the variations described above can be combined as appropriate.

What is claimed is:

1. A rotor comprising:
    a plurality of cores including a magnet insertion hole, a first opening communicating with one end of the magnet insertion hole in a circumferential direction, and an indent part communicating with the first opening and indented in the circumferential direction, the plurality of cores being stacked in an axial direction;
    a permanent magnet disposed in the magnet insertion hole; and
    a nonmagnetic resin provided in the first opening and the indent part, wherein the indent part is formed between two adjacent cores of the plurality of cores.

2. The rotor according to claim 1, wherein the plurality of cores include a first closing part closing another end of the magnet insertion hole in the circumferential direction.

3. The rotor according to claim 1, wherein the rotor satisfies Rr1>Rc1, where Rc1 is a maximum radius of the plurality of cores and Rr1 is a maximum radius of the nonmagnetic resin.

4. The rotor according to claim 1, wherein the rotor satisfies Rc3>Rc2 and Rr1>Rc2, where Rc2 is a radius of the plurality of cores in an inter-pole part, Rc3 is a radius of the plurality of cores in a magnetic pole center part, and Rr1 is a maximum radius of the nonmagnetic resin.

5. The rotor according to claim 4, wherein the rotor satisfies Rr1≤Rc3.

6. The rotor according to claim 1, wherein the nonmagnetic resin is in contact with the permanent magnet.

7. The rotor according to claim 1, further comprising:
an additional nonmagnetic resin disposed outside the plurality of cores in the axial direction, wherein
the nonmagnetic resin provided in the first opening and the indent part and the additional nonmagnetic resin are integrated as one member.

8. The rotor according to claim 1, wherein the plurality of cores have a flat surface that tilts toward the first opening.

9. The rotor according to claim 1, wherein
the plurality of cores include
a curved surface that tilts toward the first opening, and
a space communicating with the indent part, the nonmagnetic resin not being provided in the space.

10. The rotor according to claim 1, wherein
the permanent magnet forms a first magnetic pole of the rotor, and
a part of the plurality of cores adjacent to the permanent magnet in the circumferential direction forms a second magnetic pole having a polarity different from a polarity of the first magnetic pole, and the second magnetic pole is a pseudo-magnetic pole of the rotor.

11. The rotor according to claim 10, wherein
the rotor satisfies S1>S2, where S1 is a surface area of an outer peripheral surface of the first magnetic pole that is in contact with the nonmagnetic resin, and S2 is a surface area of an outer peripheral surface of the second magnetic pole that is in contact with the nonmagnetic resin.

12. The rotor according to claim 1, wherein
a first core of the plurality of cores has the first opening communicating with a downstream side of the magnet insertion hole in a rotation direction of the rotor, and
a second core of the plurality of cores has the first opening communicating with an upstream side of the magnet insertion hole in the rotation direction of the rotor.

13. The rotor according to claim 12, further comprising third cores stacked at both ends of the plurality of cores in the axial direction, wherein
each of the third cores includes a hole communicating with the magnet insertion hole and is not provided with the first opening, and
in a plane orthogonal to the axial direction, an outer periphery of the hole is closed by the third core.

14. The rotor according to claim 1, wherein
the plurality of cores include a second opening communicating with another end of the magnet insertion hole in the circumferential direction, and
the nonmagnetic resin is also provided in the second opening.

15. The rotor according to claim 14, further comprising an additional nonmagnetic resin disposed outside the plurality of cores in the axial direction and in the second opening, wherein
the nonmagnetic resin and the additional nonmagnetic resin are integrated as one member.

16. The rotor according to claim 14, further comprising second cores stacked at both ends of the plurality of cores in the axial direction, wherein
each of the second cores includes a hole communicating with the magnet insertion hole and is not provided with the first opening, and
in a plane orthogonal to the axial direction, a periphery of the hole is closed by the second cores.

17. An electric motor comprising:
the rotor according to claim 1; and
a stator disposed outside the rotor.

18. A fan comprising:
a blade; and
the electric motor according to claim 17 to drive the blade.

19. An air conditioner comprising:
an indoor unit; and
an outdoor unit connected to the indoor unit, wherein
the indoor unit, the outdoor unit, or both the indoor unit and the outdoor unit include the electric motor according to claim 17.

* * * * *